United States Patent
Mashino et al.

(10) Patent No.: US 9,294,251 B2
(45) Date of Patent: Mar. 22, 2016

(54) WIRELESS COMMUNICATION SYSTEM, TRANSMITTING DEVICE, RECEIVING DEVICE, AND WIRELESS COMMUNICATION METHOD

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 99 days.

(21) Appl. No.: 13/982,689

(22) PCT Filed: Feb. 3, 2012

(86) PCT No.: PCT/JP2012/052473
§ 371 (c)(1),
(2), (4) Date: Jul. 30, 2013

(87) PCT Pub. No.: WO2012/108346
PCT Pub. Date: Aug. 16, 2012

(65) Prior Publication Data
US 2013/0308591 A1    Nov. 21, 2013

(30) Foreign Application Priority Data

Feb. 8, 2011 (JP) ................. 2011-024814
Jun. 2, 2011 (JP) ................. 2011-124492
Jun. 2, 2011 (JP) ................. 2011-124493

(51) Int. Cl.
*H04W 80/04* (2009.01)
*H04L 5/00* (2006.01)
*H04L 1/00* (2006.01)

(52) U.S. Cl.
CPC ............ *H04L 5/0058* (2013.01); *H04L 1/0048* (2013.01); *H04L 5/0007* (2013.01)

(58) Field of Classification Search
CPC ..... H04W 80/04; H04W 88/06; H04W 28/04; H04W 72/04
See application file for complete search history.

(56) References Cited

U.S. PATENT DOCUMENTS

2004/0247035 A1* 12/2004 Schroder et al. ............. 375/253
2007/0263738 A1* 11/2007 Jitsukawa et al. ........... 375/260

(Continued)

FOREIGN PATENT DOCUMENTS

| CN | 1855693 A | 11/2006 |
|---|---|---|
| CN | 101944967 A | 1/2011 |

(Continued)

OTHER PUBLICATIONS

Jun-ichi Abe et al., "B-3-26 a Study on Spectrum Puncturing Method for Bandwidth Decomposition Signal Transmission Employing Spectrum Editing Technique", Proceedings of the 2010 IEICE Communications Society Conference 1, vol. 1, p. 297, Aug. 31, 2010, with partial translation thereof.

(Continued)

*Primary Examiner* — Andrew Lee
(74) *Attorney, Agent, or Firm* — Harness, Dickey & Pierce, P.L.C.

(57) ABSTRACT

The receiving device receives a transmitted signal from a transmitting device by dividing by N the spectrum of a signal to be transmitted and performing spectrum editing to reduce its occupied bands. The receiving device generates a first decoded signal by error-correcting and decoding this received signal in the bandwidth of the signal to be transmitted, and generates a transmission replica signal from this first decoded signal and divides by N the spectrum of this transmission replica signal to generate N sub-replicas. The receiving device generates a compensated received signal by restoring the spectrum of the signal to be transmitted from the transmitting device using the N sub-replicas and the received signal, and decodes this compensated received signal to generate a second decoded signal.

34 Claims, 26 Drawing Sheets

(56) References Cited

U.S. PATENT DOCUMENTS

| | | | | |
|---|---|---|---|---|
| 2008/0126461 | A1* | 5/2008 | Christoph | 708/403 |
| 2009/0103645 | A1* | 4/2009 | Jitsukawa et al. | 375/260 |
| 2009/0231993 | A1* | 9/2009 | Zhang et al. | 370/210 |
| 2009/0313029 | A1* | 12/2009 | Luo et al. | 704/500 |
| 2011/0007701 | A1* | 1/2011 | To et al. | 370/329 |
| 2011/0097993 | A1* | 4/2011 | Nakamura et al. | 455/7 |
| 2013/0156127 | A1* | 6/2013 | Schilling | 375/295 |
| 2013/0272254 | A1* | 10/2013 | Goto et al. | 370/329 |
| 2013/0336276 | A1* | 12/2013 | Takahashi et al. | 370/329 |

FOREIGN PATENT DOCUMENTS

| | | |
|---|---|---|
| JP | A-2011-155459 | 8/2011 |
| JP | A-2011-176406 | 9/2011 |
| WO | 2010/034360 A1 | 4/2010 |
| WO | 2010/050384 A1 | 5/2010 |
| WO | 2010/113499 A1 | 10/2010 |

OTHER PUBLICATIONS

Jun-ichi Abe et al., "Bandwidth Decomposition Employing Spectrum Editing Technique for High Frequency Utilization Efficiency", IEICE Technical Report, SAT (SatelliteTelecommunications), vol. 109, No. 340, pp. 7 to 12, Dec. 10, 2009 with English abstract thereof.

International Search Report for PCT/JP2012/052473, ISA/JP, in English and Japanese, mailed Apr. 24, 2012.

Office Action, Chinese Patent Application No. 201280007112.9, May 26, 2015.

Abe, Jun-Ichi, et al., "Direct Spectrum Division Transmission for Highly Efficient Satellite Communications," 2010 5th Advanced Satellite Multimedia Systems Conference and the 11th Signal Processing for Space Communications Workshop, Sep. 13, 2010, pp. 401-406.

Supplementary Partial Search Report, European Patent Application No. 12744934.6, Aug. 25, 2015.

* cited by examiner

FIG.1
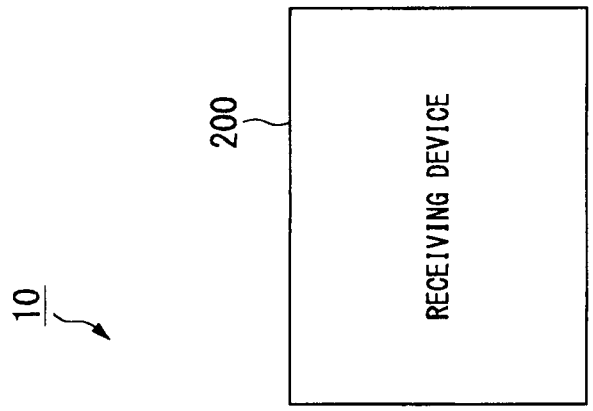
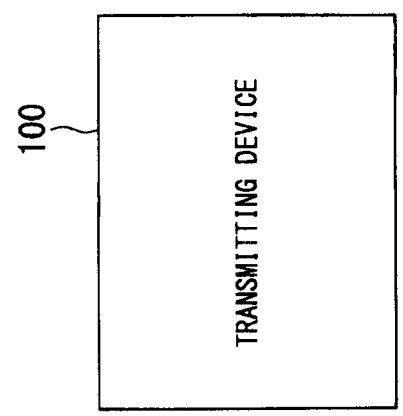

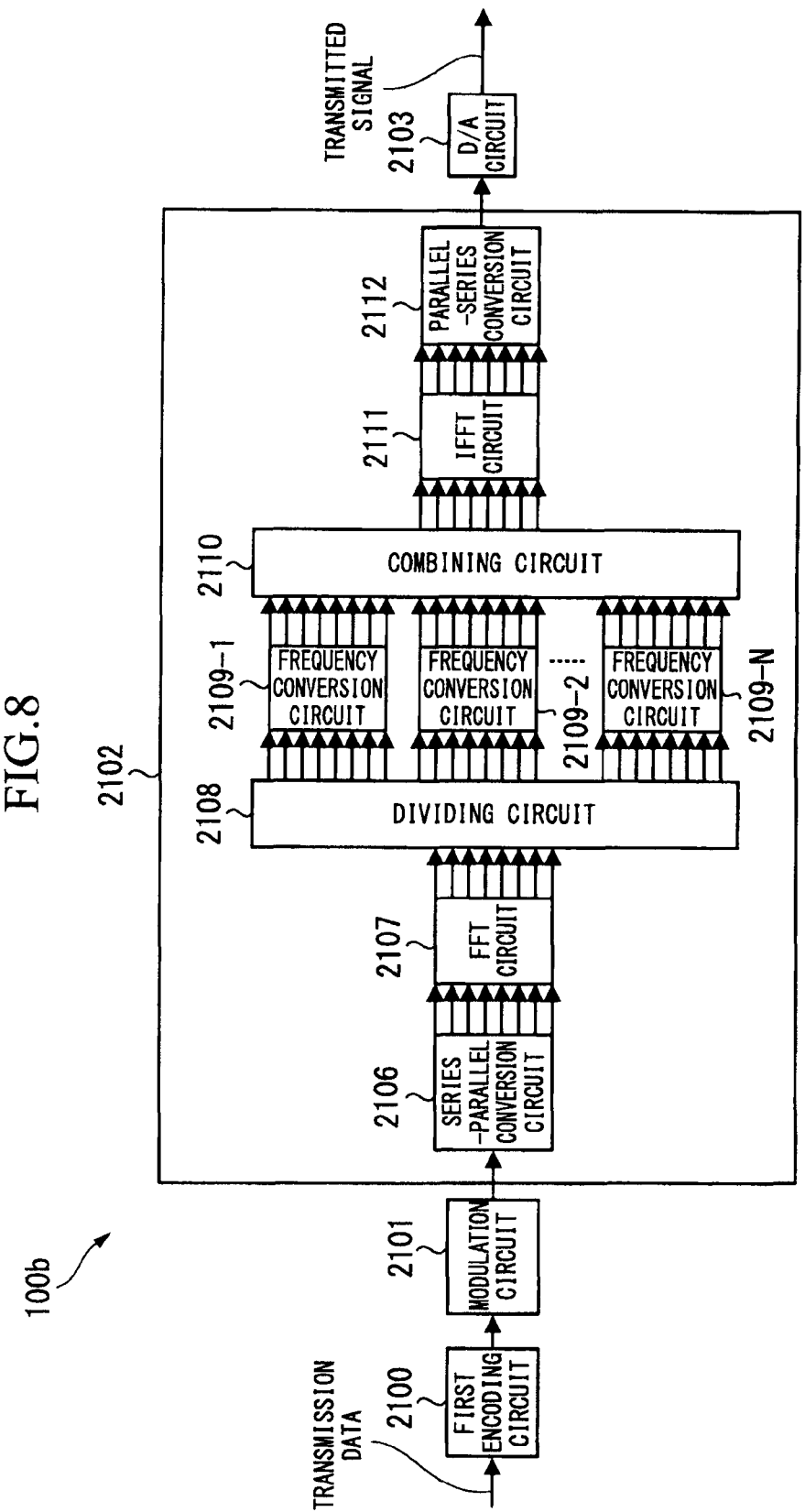

FREQUENCY

FREQUENCY

FREQUENCY

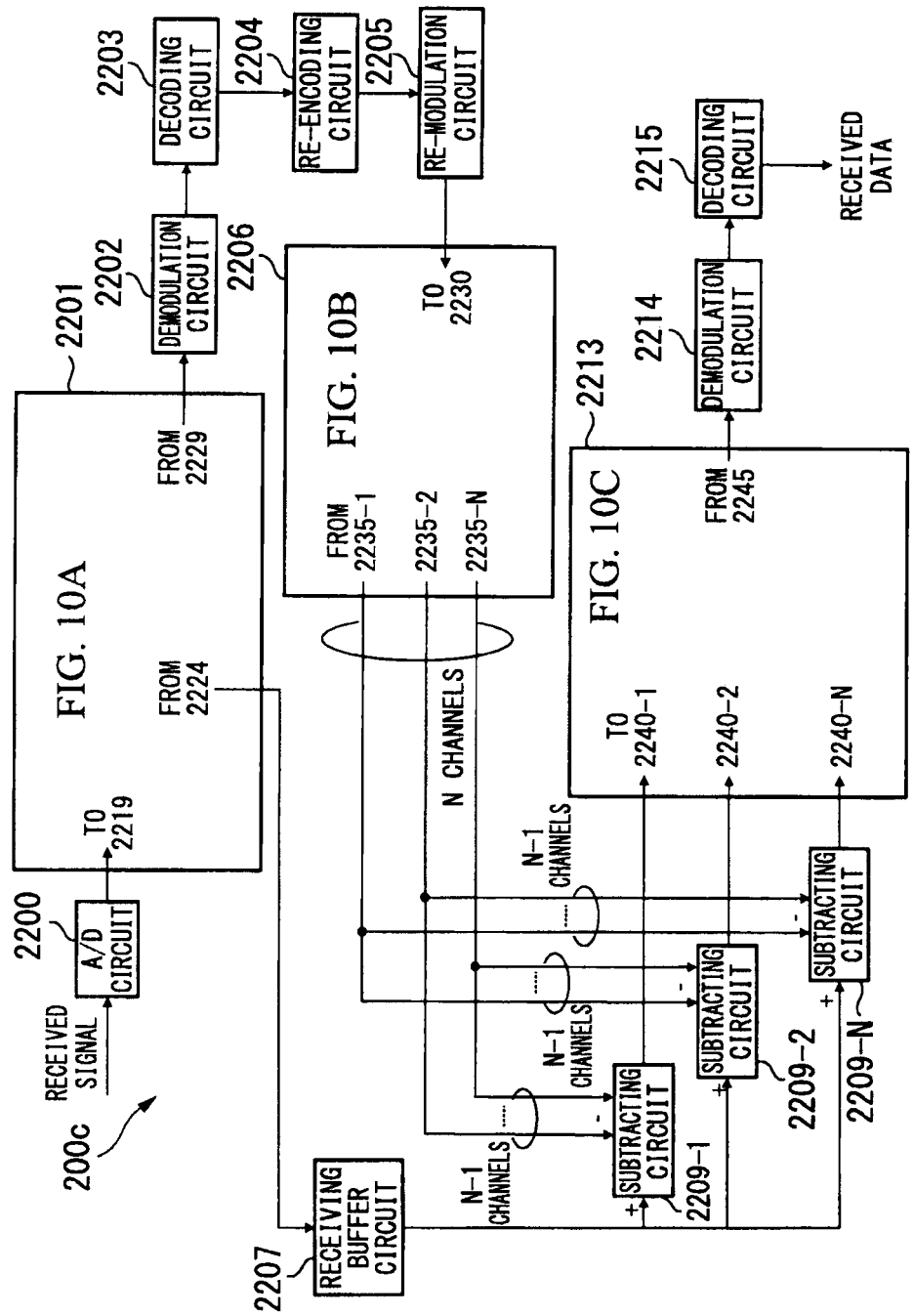

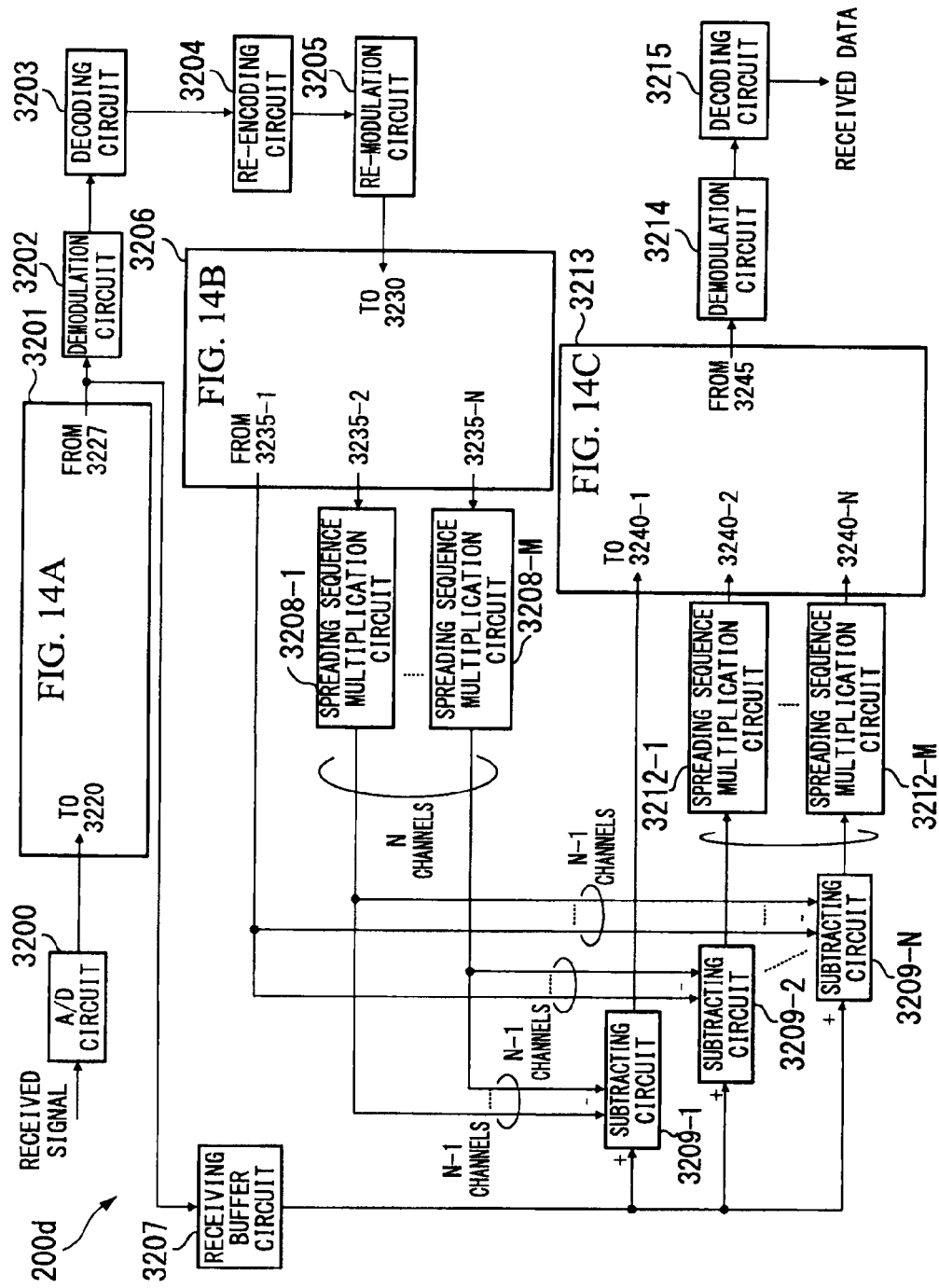

FREQUENCY

FREQUENCY

FREQUENCY

FREQUENCY

WIRELESS COMMUNICATION SYSTEM, TRANSMITTING DEVICE, RECEIVING DEVICE, AND WIRELESS COMMUNICATION METHOD

CROSS-REFERENCE TO RELATED APPLICATIONS

This application is a 371 U.S. National Stage of International Application No. PCT/JP2012/052473, filed Feb. 3, 2012. Priority is claimed on Japanese Patent Application No. 2011-024814, filed Feb. 8, 2011, and Japanese Patent Application No. 2011-124492, filed Jun. 2, 2011, and Japanese Patent Application No. 2011-124493 filed Jun. 2, 2011, the contents of which are incorporated herein by reference.

TECHNICAL FIELD

The present invention relates to a wireless communication system that demodulates and decodes a signal transmitted by removing or superimposing some band of the spectrum of the transmission signal and restores the transmitted data, a transmitting device, a receiving device, and a wireless communication method.

BACKGROUND ART

Conventionally, in wire communication and wireless communication, improving the utilization efficiency of the frequency band is required given the increasing demand. In order to improve the use efficiency of a frequency band, for example, a technique has been disclosed that divides and transmits the spectrum of the transmission signal into a plurality of bands (hereinbelow referred to as "sub-spectra"), receives the sub-spectra that have been transmitted and restores them to the original modulated signal (refer to Non-Patent Document 1). In this technique, by utilizing the empty bands dispersed on the frequency axis, the bands that are not used are reduced. Furthermore, removing a portion of a sub-spectrum reduces the total of the occupied bandwidth of the signal. The technique disclosed in Non-Patent Document 1 realizes an improvement of the utilization efficiency of the band of frequencies in the above manner.

FIG. 16 is a function block diagram showing a function configuration of a communication system 500 that is implemented using a related technique. The communication system 500 includes a transmitting device 510 and a receiving device 520.

The transmitting device 510 performs transmission by dividing a transmission signal into a plurality of sub-spectra. The receiving device 520 receives the signal transmitted from the transmitting device 510 and restores the modulated signal prior to the division.

As shown in FIG. 16, the transmitting device 510 is provided with a modulation circuit 601 and a transmission filter bank 602, and a D/A converter 603. The receiving device 520 is provided with an A/D converter 611, a reception filter bank 612, and a demodulation circuit 613. The transmission filter bank 602 is provided with a series-parallel conversion circuit 604, a FFT (fast Fourier transform) circuit 605, a dividing circuit 606, N (where N is an integer of 1 or more) switches SW-1 to SW-N, N frequency shifters 607-1 to 607-N, an adding circuit 608, an IFFT (inverse fast Fourier transform) circuit 609, and a parallel-series conversion circuit 610. The reception filter bank 612 is provided with a series-parallel conversion circuit 614, an FFT circuit 615, an extraction circuit 616, N frequency shifters 617-1 to 617-N, a distortion compensating circuit 618, and adding circuit 619, an IFFT circuit 620, and a parallel-series conversion circuit 621.

The flow of a signal in the communication system 500 shall next be described. FIGS. 17 (A) to (C) are drawings that shows an example of processing when the transmitting device 510 divides the band into N parts (N=2) and arranges them by dispersion. FIGS. 17 (D) to (F) are drawings showing an example of processing when the receiving device 520 combines the bands that have been divided by the transmitting device 510. The modulation circuit 601 of the transmitting device 510 modulates the data signal to be transmitted by a method such as QPSK and inputs the modulated signal that has been waveform shaped as shown in (A) of FIG. 17 to the transmission filter bank 602. The output signal from the transmission filter bank 602 is converted to an analog signal by the D/A converter 603 and transmitted.

Processing is performed as follows in the transmission filter bank 602. First, the series-parallel conversion circuit 604 performs series-parallel conversion of the input signal, and the FFT circuit 605 performs a fast Fourier transform to convert the signal from the time domain to the frequency domain. Next, the dividing circuit 606 multiplies coefficients that divide the signal bands shown by the dotted lines 701-1 and 701-2 in (A) of FIG. 17 into N by the modulated signal that has been converted to the frequency domain, and generates N sub-spectra ((B) of FIG. 17). Next, the frequency shifters 607-1 to 607-N arrange the N sub-spectra by dispersing over predetermined bands on the frequency axis, and the adding circuit 608 sums the outputs of the frequency shifters 607-1 to 607-N ((C) of FIG. 17).

Next, the IFFT circuit 609 performs a fast inverse Fourier transform to convert the signal from the frequency domain to the time domain. Then, the parallel-series conversion circuit 610 performs parallel-series conversion. At this time, regarding bands that are to be partially deleted, prior to input to the frequency shifters 607-1 to 607-N, conveyance of the signal is blocked by putting those switches SW-1 to SW-N corresponding to the deletion in the open state (OFF). Thereby, due to the signal components not being placed in the relevant bands, it is possible to perform transmission in a state of a portion of the spectrum having been removed. Accordingly, it is possible to remove the frequency band required for transmission.

The A/D converter 611 of the receiving device 520 converts the received signal to a digital signal, and inputs the post-conversion digital signal to the reception filter bank 612. The demodulation circuit 613 demodulates the modulated signal outputted from the reception filter bank 612, and restores the data signal.

Processing is performed as follows in the reception filter bank 612. First, the series-parallel conversion circuit 614 performs series-parallel conversion of the input signal, and the FFT circuit 615 performs a fast Fourier transform to convert the signal from the time domain to the frequency domain. Next, the extraction circuit 616 multiplies coefficients shown by the dotted lines 701-3 and 701-4 in (D) of FIG. 17 by the received signal that has been converted to the frequency domain, and extracts N sub-spectra. Next, the frequency shifters 617-1 to 617-N return the sub-spectra that have been extracted to their respective bands prior to be shifted by the frequency shifters 607-1 to 607-N of the transmitting device 510 ((E) of FIG. 17). Next, the adding circuit 619 adds together all of the sub-spectra and obtains the combined modulated signal ((F) of FIG. 17).

Next, the IFFT circuit 629 performs a fast inverse Fourier transform to convert the signal from the frequency domain to the time domain. Then, the parallel-series conversion circuit 621 performs parallel-series conversion. At this time, the transmission signal is not received in the receiving device 520 for the some bands of which the spectrum was removed in the transmitting device 510. For this reason, some kind of compensation processing is required. For example, not only is there not a component of the transmission signal in this band, but there may exist a noise component that causes degradation of the reception characteristic. Therefore, the distortion compensation circuit 618 performs compensation by inputting a value based on the sub-spectrum that was received by the receiving device 520 to the band in which the signal was transmitted in the transmitting device 510, and inputting "0" for a band in which the signal was removed in the transmitting device 510. Thereby, the noise component in the band is removed for the band in which the signal was removed in the transmitting device 510, and the reception characteristic can be improved.

In the above manner, the communication system 500 divides the occupied band of a transmitted signal, and arranges each sub-spectrum that is generated by dispersion in arbitrary locations on the frequency axis. For that reason, discontinuous empty bands can be effectively utilized. Also, by not transmitting some bands of a transmission signal spectrum, the frequency bandwidth that is required for transmission is reduced, and it is possible to improve frequency utilization efficiency.

PRIOR ART DOCUMENTS

Non-Patent Documents

[Non-Patent Document 1] Jun-ichi ABE et al., "A Study on Spectrum Puncturing Method for Bandwidth Decomposition Signal Transmission Employing Spectrum Editing Technique" 2010 IEICE Society Conference, B-3-26, September 2010.

DISCLOSURE OF THE INVENTION

Problems to be Solved by the Invention

However, when distortion compensation is performed by inputting "0" for a band in which the signal is removed in the transmitting device, although the noise component for this band is removed, in terms of being a spectrum it becomes a spectrum lacking this band. For that reason, there is the problem of the error rate rising during demodulation and decoding of the signal.

In view of the above problem, an object of one aspect of the present invention is to provide a technique that can improve the transmission characteristics of a signal that is transmitted with some bands of the spectrum removed.

Moreover, when a signal is removed in the transmitting device 510, the removed component is lost during transmission. A method is conceivable of raising the frequency utilization efficiency by frequency shifting by means of permitting the superimposition of some sub-spectra in the frequency domain, instead of signal removal. In this method, the frequency component of any sub-spectrum is not removed. However, there is a problem of there being a need to perform compensation on the receiving device 520 side for the superimposed sub-spectra.

Another aspect of the present invention is one that considers such circumstances, and the object thereof is to compensate on the receiving side the superimposed band of the transmitted signal that was transmitted by superimposing some bands of the spectrum.

Moreover, in the method that raises the frequency utilization efficiency by frequency shifting by means of permitting the superimposition of some sub-spectra in the frequency domain, there is the problem of there being a need to divide the superimposed sub-spectrum on the receiving device side.

Yet another aspect of the present invention was achieved in consideration of these circumstances, and has as its object to restore a transmitted signal with no superimposed components, without losing the signal component itself.

Means for Solving the Problems

A first aspect of the receiving device of the present invention is provided with a means that receives, as a received signal, a signal that has been transmitted by dividing by N the spectrum of a signal to be transmitted and performing spectrum editing to reduce its occupied bands; a means that generates a first decoded signal by error-correcting and decoding the received signal in the bandwidth of the signal to be transmitted; a means that generates a transmission replica signal from the first decoded signal and divides by N the spectrum of the transmission replica signal to generate N sub-replicas; a means that generates a compensated received signal by restoring the spectrum of the signal to be transmitted using the N sub-replicas and the received signal; and a means that decodes the compensated received signal to generate a second decoded signal.

A second aspect of the receiving device of the present invention is a receiving device that receives a signal that has been transmitted by components of some bands of the transmission object signal being removed by a transmitting device, provided with a first parallel-series conversion circuit that carries out series-parallel conversion of a signal that has been received; a first FFT circuit that performs a Fourier transform on the signal that has undergone series-parallel conversion; an extraction circuit that extracts a signal component in each predetermined frequency band from the signal that undergone a Fourier transform; a distortion compensation circuit that performs distortion compensation using predetermined signal components, on signal components of bands that have been removed by the transmitting device, among the plurality of signal components; a first IFFT circuit that performs an inverse Fourier transform on the signal that has been distortion compensated; a first parallel-series conversion circuit that carries out parallel-series conversion of the signal that has been subjected to the inverse Fourier transform; a first demodulation circuit that demodulates the signal that has undergone parallel-series conversion; a first error correction decoding circuit that performs error correction decoding on the signal that has been demodulated; a transmission signal replica generating circuit that generates a replica of the transmission object signal from the signal on which the error correction decoding was performed; a second parallel-series conversion circuit that carries out parallel-series conversion of the transmission signal replica; a second FFT circuit that performs a Fourier transform on the transmission signal replica that has undergone series-parallel conversion; a dividing circuit that extracts the signal components of some bands that were removed by the transmitting device from the transmission signal replica that has been subjected to the Fourier transform; a receiving buffer that stores the received signal; a combining circuit that combines the signal that has been stored in the receiving buffer and the signal components that have been extracted by the dividing circuit and outputs a combined signal; a second demodulation circuit that demodulates the combined signal; and a second error correction decoding circuit that performs error correction decoding on the combined signal that has been demodulated.

In the receiving device of the second aspect of the present invention, the distortion compensation circuit may perform the distortion compensation by attenuating the signal components of the bands that have been removed by the transmitting device, while leaving the signal components of the bands that have not been removed by the transmitting device as they are.

The third aspect of the receiving device of the present invention is a receiving device that performs wireless communication with a transmitting device, provided with a reception filter circuit that divides a received signal into N sub-spectra, frequency-converts the received signal that has been divided to return it to the frequency prior to being frequency-converted in the transmitting device, and combines the receives signal that has been divided and frequency converted; a first demodulation circuit that demodulates the received signal from the reception filter circuit to generate a tentative demodulated signal; a re-modulation circuit that modulates the tentative demodulated signal from the first demodulation circuit to generate a re-modulated signal; a sub-spectrum replica generating filter circuit that divides the re-modulated signal generated by the re-modulation circuit into N divided sub-spectrum replicas, converts each of the N sub-spectrum replicas to the same frequency as the frequency conversion in the transmitting device and outputs them; subtracting circuits that extract N post-compensation sub-received signals by subtracting from the received signal respective combinations of N−1 sub-spectrum replicas among the sub-spectrum replicas divided into N that were converted by the sub-spectrum replica generating filter circuit; a combining filter circuit that converts the N post-compensation sub-received signals that were extracted by the subtracting circuits to the frequency of each modulated signal prior to frequency conversion at the transmitting device side, and combines the N post-compensation received signals that have been frequency converted to generate a post-compensation received signal; and a second demodulation circuit that demodulates the post-compensation received signal combined by the combining filter circuit.

Also, in the first aspect of the wireless communication system that is constituted by a transmitting device and a receiving device of the present invention, the transmitting device is provided with an encoding circuit that encodes transmission data; a modulation circuit that modulates the encoded data that was encoded by the encoding circuit; and a transmission filter circuit that converts the modulated signal that was modulated by the modulation circuit into N divided sub-spectra, frequency converts the divided N modulated signals to superimpose some of the sub-spectra, and combines and outputs the N modulated signals on which some of the sub-spectra have been superimposed;

and the receiving device is provided with a reception filter circuit that divides the received signal into N sub-spectra, frequency-converts the received signal that has been divided to return it to the frequency prior to being frequency-converted in the transmitting device, and combines the received signal that has been divided and frequency converted; a first demodulation circuit that demodulates the received signal from the reception filter circuit to generate a tentative demodulated signal; a re-modulation circuit that modulates the tentative demodulated signal from the first demodulation circuit to generate a re-modulated signal; a sub-spectrum replica generating filter circuit that divides the re-modulated signal generated by the re-modulation circuit into N divided sub-spectrum replicas, converts each of the N sub-spectrum replicas to the same frequency as the frequency conversion in the transmitting device and outputs them; subtracting circuits that extract N post-compensation sub-received signals by subtracting from the received signal respective combinations of N−1 sub-spectrum replicas among the sub-spectrum replicas divided into N that were converted by the sub-spectrum replica generating filter circuit; a combining filter circuit that converts the N post-compensation sub-received signals that were extracted by the subtracting circuits to the frequency of each modulated signal prior to frequency conversion at the transmitting device side, and combines the N post-compensation sub-received signals that have been frequency converted to generate a post-compensation received signal; and a second demodulation circuit that demodulates the post-compensation received signal combined by the combining filter circuit.

In the wireless communication system of the first aspect of the present invention, the transmission filter circuit may be provided with a first FFT circuit that performs a Fourier transform on the modulated signal that has been modulated by the modulation circuit; a first dividing circuit that divides the modulated signal that underwent a Fourier transform by the first FFT circuit into N sub-spectra; first frequency conversion circuits that frequency-convert the N sub-spectra that have been divided by the first dividing circuit to superimpose some of the sub-spectra; a first combining circuit that combines the N sub-spectra that have been frequency-converted by the first frequency conversion circuits; and a first IFFT circuit that carries out an inverse Fourier transform on the sub-spectra that have been combined by the first combining circuit to generate a transmission signal.

In the wireless communication system of the first aspect of the present invention, the reception filter circuit may be provided with a second FFT circuit that performs a Fourier transform on the received signal; a second dividing circuit that divides the received signal that has undergone a Fourier transform by the second FFT circuit into N sub-spectra; second frequency conversion circuits that frequency-convert the N sub-spectra that have been divided by the second dividing circuit to return them to their frequencies prior to being frequency-converted at the transmitting device; a second combining circuit that combines the N sub-spectra that have been frequency-converted by the second frequency conversion circuits; and a second IFFT circuit that carries out an inverse Fourier transform on the received signal that has been combined by the second combining circuit.

In the wireless communication system of the first aspect of the present invention, the sub-spectrum replica generating filter circuit may be provided with a third FFT circuit that performs a Fourier transform on the re-modulated signal that has been generated by the re-modulation circuit; a second dividing circuit that divides the re-modulated signal that has undergone a Fourier transform by the third FFT circuit into N sub-spectrum replicas of the same frequency bands as the some sub-spectra that have been superimposed by the transmitting device; third frequency conversion circuits that convert each of the N sub-spectrum replicas that have been divided by the second dividing circuit to the same frequency as the frequency conversion in the transmitting device; and a third IFFT circuit that carries out and outputs an inverse Fourier transform on the N sub-spectrum replicas that have been converted to the same frequency by the third frequency conversion circuits.

In the wireless communication system of the first aspect of the present invention, the combining filter circuit is provided with fourth frequency conversion circuits that convert the N post-compensation sub-received signals that have undergone a reverse spreading process by the reverse spreading processing circuit to the frequency of each modulated signal prior to frequency conversion at the transmitting device side; a third combining circuit that combines the N post-compensation sub-received signals that have been frequency converted by the fourth frequency conversion circuits to generate a post-compensation received signal; and a third IFFT circuit that carries out an inverse Fourier transform on the post-compensation received signal that was combined by the third combining circuit.

Also, the first aspect of the transmitting device of the present invention is a transmitting device that performs wireless communication with a receiving device, provided with an encoding circuit that encodes transmission data; a modulation circuit that modulates the encoded data that was encoded by the encoding circuit; and a transmission filter circuit that converts the modulated signal that was modulated by the modulation circuit into N divided sub-spectra, frequency converts the divided N modulated signals to superimpose some of the sub-spectra, and combines and outputs the N modulated signals on which some of the sub-spectra have been superimposed.

Also, the fourth aspect of the receiving device of the present invention is a receiving device that performs wireless communication with a transmitting device, provided with a reception filter circuit that, with respect to the received signal, inserts a "0" into the frequency bands other than the frequency band of the sub-spectrum with the greatest frequency bandwidth among sub-spectra that are frequency bands of the modulated signal and that have been divided by N, and outputs the received signal in which "0" has been inserted; a first demodulation circuit that demodulates the received signal from the reception filter circuit to output a tentative demodulated signal; a re-modulation circuit that modulates the tentative demodulated signal from the first demodulation circuit to generate a re-modulated signal; a sub-spectrum replica generating filter circuit that converts the re-modulated signal that has been generated by the re-modulation circuit into N-divided sub-re-modulated signals and outputs them; a second spreading circuit that, among the sub-re-modulated signals divided by N by the sub-spectrum replica generating filter circuit, spreads those other than the sub-re-modulated signal with the greatest frequency bandwidth; subtracting circuits that extract N post-compensation sub-received signals by subtracting from the received signal respective combinations of N−1 sub-re-modulated signals; a reverse spreading processing circuit that, among the N post-compensation sub-received signals extracted by the subtracting circuits, carries out reverse spreading processing on those that underwent spreading processing at the transmitting device side; a combining filter circuit that converts the N post-compensation sub-received signals that were reverse spreading processed by the reverse spreading processing circuit to the frequency of each modulated signal prior to frequency conversion at the transmitting device side, and combines the N post-compensation sub-received signals that have been frequency converted to generate a post-compensation received signal; and a second demodulation circuit that demodulates the post-compensation received signal that was combined by the combining filter circuit.

Moreover, in the second aspect of the wireless communication system that is constituted by a transmitting device and a receiving device, the transmitting device is provided with an encoding circuit that encodes transmission data; a modulation circuit that modulates the encoded data that was encoded by the encoding circuit; a transmission filter circuit that converts the modulated signal that was modulated by the modulation circuit into sub-spectra divided into N and outputs them; a first spreading circuit that, among the sub-spectra divided into N by the transmission filter circuit, spreads N−1 sub-spectra other than the sub-spectrum with the greatest frequency bandwidth in a range equal to or less than the bandwidth of the sub-spectrum with the greatest frequency bandwidth; and a first combining circuit that combines the sub-spectrum with the greatest frequency bandwidth and the N−1 sub-spectra that have been spread by the first spreading circuit to generate a transmission signal; and the receiving device is provided with a reception filter circuit that, in the received signal, inserts a "0" into the frequency bands other than the frequency band of the sub-spectrum with the greatest frequency bandwidth among sub-spectra that are frequency bands of the modulated signal and that have been divided by N (N being an integer of 2 or more), and outputs the received signal in which "0" has been inserted; a first demodulation circuit that demodulates the received signal from the reception filter circuit to generate a temporarily demodulated signal; a re-modulation circuit that modulates the temporarily demodulated signal from the first demodulation circuit to generate a re-modulated signal; a sub-spectrum replica generating filter circuit that converts the re-modulated signal that has been generated by the re-modulation circuit into N-divided sub-re-modulated signals and outputs them; a second spreading circuit that, among the sub-re-modulated signals divided by N by the sub-spectrum replica generating filter circuit, spreads those other than the sub-re-modulated signal with the greatest frequency bandwidth to the same bandwidth as the sub-re-modulated signal with the greatest frequency bandwidth; subtracting circuits that extract N post-compensation sub-received signals by subtracting from the received signal respective combinations of N−1 sub-re-modulated signals; a reverse spreading processing circuit that, among the N post-compensation sub-received signals extracted by the subtracting circuits, carries out reverse spreading processing on those that underwent spreading processing at the transmitting device side; a combining filter circuit that converts the N post-compensation sub-received signals that were reverse spreading processed by the reverse spreading processing circuit to the frequency of each modulated signal prior to frequency conversion at the transmitting device side, and combines the N post-compensation sub-received signals that have been frequency converted to generate a post-compensation received signal; and a second demodulation circuit that demodulates the post-compensation received signal that was combined by the combining filter circuit.

In the wireless communication system according to the second aspect of the present invention, the transmission filter circuit may be provided with a first FFT circuit that performs a Fourier transform on the modulated signal that was modulated by the modulation circuit; a first dividing circuit that divides the modulated signal that underwent a Fourier transform by the first FFT circuit into N sub-spectra; first frequency conversion circuits that convert the N sub-spectra that were divided by the first dividing circuit to the same frequency as the sub-spectrum with the greatest frequency bandwidth; and a first IFFT circuit that carries out an inverse Fourier transform on the N sub-spectra that were converted to the same frequency by the first frequency conversion circuits and outputs them.

In the wireless communication system of the second aspect of the present invention, the reception filter circuit may be provided with a second FFT circuit that performs a Fourier transform on the received signal; a null inserting circuit that, in the received signal that has been subjected to a Fourier transform, inserts a "0" into the frequency bands other than the frequency band of the sub-spectrum with the greatest frequency bandwidth among sub-spectra that have been divided by the first dividing circuit; and a second IFFT circuit that performs an inverse Fourier transform on the received signal in which the "0" has been inserted.

In the wireless communication system of the second aspect of the present invention, the sub-spectrum replica generating filter circuit may be provided with a third FFT circuit that performs a Fourier transform on the re-modulated signal that has been generated by the re-modulation circuit; a second dividing circuit that divides the re-modulated signal that has undergone a Fourier transform by the third FFT circuit into N sub-re-modulated signals of the same frequency bands as the frequency conversion in the transmitting device; third frequency conversion circuits that convert each of the N sub-re-modulated signals that have been divided by the second dividing circuit to the same frequency as the frequency conversion in the transmitting device; and a third IFFT circuit that carries out and outputs an inverse Fourier transform on the N sub-re-modulated signals that have been converted to the same frequency by the third frequency conversion circuits.

In the wireless communication system of the second aspect of the present invention, the combining filter circuit may be provided with third frequency conversion circuits that convert the post-compensation sub-received signals that have undergone a reverse spreading process by the reverse spreading processing circuit to the frequency of each modulated signal prior to frequency conversion at the transmitting device side; and a second combining circuit that combines the N post-compensation sub-received signals that have been frequency converted by the third frequency conversion circuits to generate a post-compensation received signal.

Also, the second aspect of the transmitting device of the present invention is provided with an encoding circuit that encodes transmission data; a modulation circuit that modulates the encoded data that was encoded by the encoding circuit; a transmission filter circuit that converts the modulated signal that was modulated by the modulation circuit into sub-spectra divided into N and outputs them; a first spreading circuit that, among the sub-spectra divided into N by the transmission filter circuit, spreads N−1 sub-spectra other than the sub-spectrum with the greatest frequency bandwidth in a range equal to or less than the bandwidth of the sub-spectrum with the greatest frequency bandwidth; and a first combining circuit that combines the sub-spectrum with the greatest frequency bandwidth and the N−1 sub-spectra that have been spread by the first spreading circuit to generate a transmission signal.

Moreover, a receiving method of the present invention is a receiving method that receives a signal that has been transmitted by components of some bands of the transmission object signal being removed by a transmitting device, the receiving method having a first parallel-series conversion step that carries out series-parallel conversion of a signal that has been received; a first FFT step that performs a Fourier transform on the signal that has undergone series-parallel conversion; an extraction step that extracts a signal component in each predetermined frequency band from the signal that undergone a Fourier transform; a distortion compensation step that performs distortion compensation using predetermined signal components, on signal components of bands that have been removed by the transmitting device, among the plurality of signal components; a first IFFT step that performs an inverse Fourier transform on the signal that has been distortion compensated; a first parallel-series conversion step that carries out parallel-series conversion of the signal that has been subjected to the inverse Fourier transform; a first demodulating step that demodulates the signal that has undergone parallel-series conversion; a first error correction decoding step that performs error correction decoding on the signal that has been demodulated; a transmission signal replica generating step that generates a replica of the transmission object signal from the signal on which the error correction decoding was performed; a second parallel-series conversion step that carries out parallel-series conversion of the transmission signal replica; a second FFT step that performs a Fourier transform on the transmission signal replica that has undergone series-parallel conversion; a dividing step that extracts the signal components of some bands that were removed by the transmitting device from the transmission signal replica that has been subjected to the Fourier transform; a receiving buffer step that stores the received signal; a combining step that combines the signal that has been stored in the receiving buffer and the signal components that have been extracted by the dividing circuit and outputs a combined signal; a second demodulating step that demodulates the combined signal; and a second error correction decoding step that performs error correction decoding on the combined signal that has been demodulated.

Also, the first aspect of the wireless communication method of the present invention is a wireless communication method that is performed by a transmitting device and a receiving device, the transmitting device including a step that encodes transmission data; a step that modulates the encoded data that was encoded; and a step that converts the modulated signal that was modulated into N divided sub-spectra, frequency converts the divided N modulated signals to superimpose some of the sub-spectra, and combines and outputs the N modulated signals on which some of the sub-spectra have been superimposed; and the receiving device including a step that divides the received signal into N sub-spectra, frequency-converts the received signal that has been divided to return it to the frequency prior to being frequency-converted in the transmitting device, and combines the received signal that has been divided and frequency converted; a step that demodulates the received signal that has been combined to generate a tentative demodulated signal; a step that modulates the tentative demodulated signal to generate a re-modulated signal; a step that divides the re-modulated signal that has been generated into N divided sub-spectrum replicas, converts each of the N sub-spectrum replicas to the same frequency as the frequency conversion in the transmitting device and outputs them; a step that extracts N post-compensation sub-received signals by subtracting from the received signal respective combinations of N−1 sub-spectrum replicas among the sub-spectrum replicas divided into N that were converted; a step that converts the N post-compensation sub-received signals that were extracted to the frequency of each modulated signal prior to frequency conversion at the transmitting device side, and combines the N post-compensation sub-received signals that have been frequency converted to generate a post-compensation received signal; and a step that demodulates the post-compensation received signal that was combined.

Also, the second aspect of the wireless communication method of the present invention is a wireless communication method that is performed by a transmitting device and a receiving device, the transmitting device including Also, the second aspect of the wireless communication method of the present invention is a wireless communication method that is performed by a transmitting device and a receiving device, the transmitting device including a step that encodes transmission data; a step that modulates the encoded data that was encoded; a step that converts the modulated signal that was modulated into sub-spectra divided into N and outputs them; a step that, among the sub-spectra divided into N, spreads N−1 sub-spectra other than the sub-spectrum with the greatest frequency bandwidth in a range equal to or less than the bandwidth of the sub-spectrum with the greatest frequency bandwidth; and a step that combines the sub-spectrum with the greatest frequency bandwidth and the N−1 sub-spectra that have been spread to generate a transmission signal; and the receiving device includes a step that, in the received signal, inserts a "0" into the frequency bands other than the frequency band of the sub-spectrum with the greatest frequency bandwidth among sub-spectra that are frequency bands of the modulated signal and that have been divided by N, and outputs the received signal in which "0" has been inserted; a step that demodulates the received signal in which "0" has been inserted to output a tentative demodulated signal; a step that modulates the tentative demodulated signal to generate a re-modulated signal; a step that converts the re-modulated signal that has been generated into N-divided sub-re-modulated signals and outputs them; a step that, among the sub-re-modulated signals divided by N, spreads those other than the sub-re-modulated signal with the greatest frequency bandwidth to the same bandwidth as the sub-re-modulated signal with the greatest frequency bandwidth; a step that extracts N post-compensation sub-received signals by subtracting from the received signal respective combinations of N−1 sub-re-modulated signals; a step that, among the N post-compensation sub-received signals that were extracted, carries out reverse spreading processing on those that underwent spreading processing at the transmitting device side; a step that converts the N post-compensation sub-received signals that were reverse spreading processed to the frequency of each modulated signal prior to frequency conversion at the transmitting device side, and combines the N post-compensation sub-received signals that have been frequency converted to generate a post-compensation received signal; and a step that demodulates the post-compensation received signal that was combined.

Effects of the Invention

According to one aspect of the present invention, it is possible to improve the transmission characteristics of a signal that is transmitted with some band of the spectrum removed.

According to another aspect of the present invention, it is possible to compensate at the reception side a superimposed band of a signal that was transmitted by superimposing some bands of the spectrum.

According to yet another aspect of the present invention, it is possible to restore a transmitted signal with no superimposed components without losing the signal component itself.

BRIEF DESCRIPTION OF THE DRAWINGS

FIG. 1 is a configuration diagram that shows the configuration of the transmission system according to one embodiment of the present invention.

FIG. 8 is a block diagram that shows the second embodiment of the transmitting device according to the present invention.

FIG. 10 is a block diagram that shows the third embodiment of the receiving device according to the present invention.

FIG. 14 is a block diagram that shows the fourth embodiment of the receiving device.

EMBODIMENTS FOR CARRYING OUT THE INVENTION

Hereinbelow, the embodiments of the present invention shall be described with reference to the drawings.

First the communication system 10 shall be described. Note that in order to simplify the description, the case shall be described of the communication system transmitting a signal only by continuous empty bands, without using empty bands dispersed on the frequency axis. That is to say, in the below description, a frequency shifter shall be omitted from the transmitting device and the receiving device.

FIG. 1 is a system configuration drawing that shows an outline of the constitution of the communication system 10. The communication system 10 is provided with a transmitting device 100 and a receiving device 200. The transmitting device 100 and the receiving device 200 transmit and receive data by wire communication or wireless communication.

Figure 2:
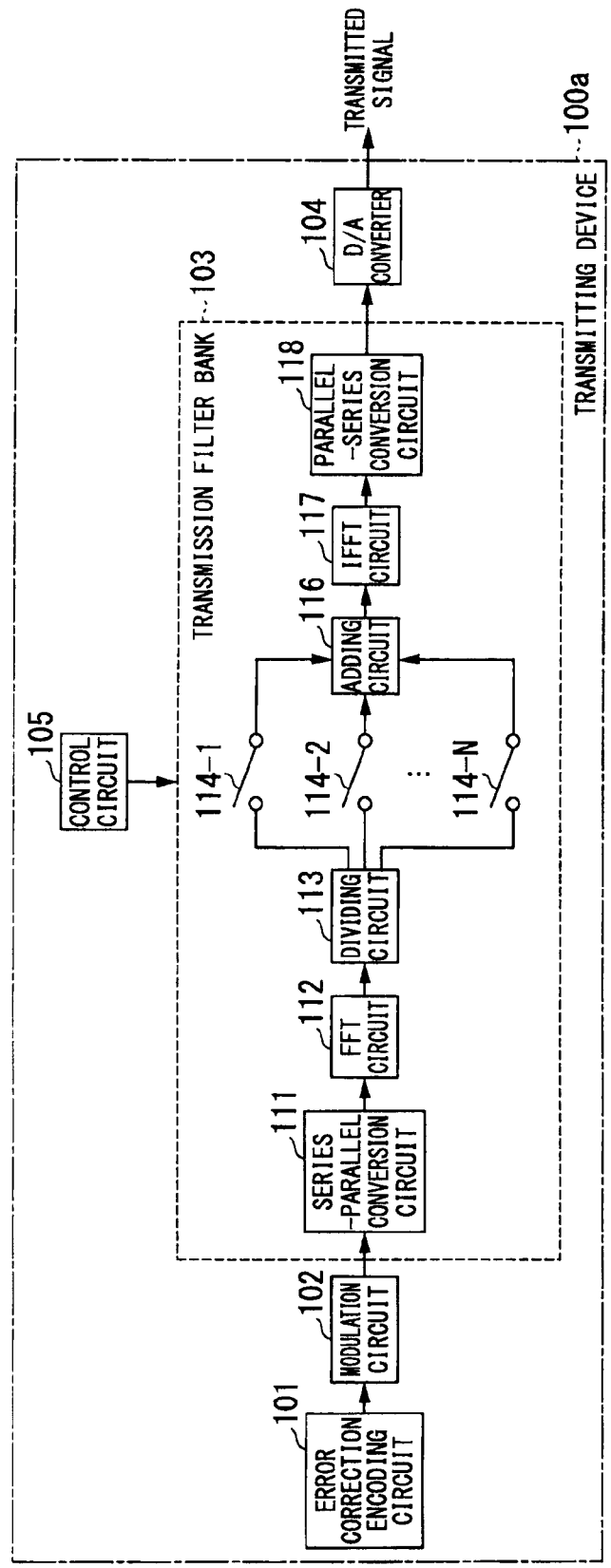
FIG. 2 is a block diagram that shows the first embodiment of the transmitting device according to the present invention.

First, the constitution of the transmitting device 100 shall be described. FIG. 2 is a functional block diagram that expresses the function configuration of the transmitting device 100a according to the first embodiment. The transmitting device 100a is provided with an error correction encoding circuit 101, a modulation circuit 102, a transmission filter bank 103, a D/A converter 104, and a control circuit 105. The transmission filter bank 103 is provided with a series-parallel conversion circuit 111, a FFT (fast Fourier transform) circuit 112, a dividing circuit 113, N (where N is an integer of 1 or more) switches 114-1 to 114-N, an adding circuit 116, an IFFT (inverse fast Fourier transform) circuit 117, and a parallel-series conversion circuit 118.

Figure 3:
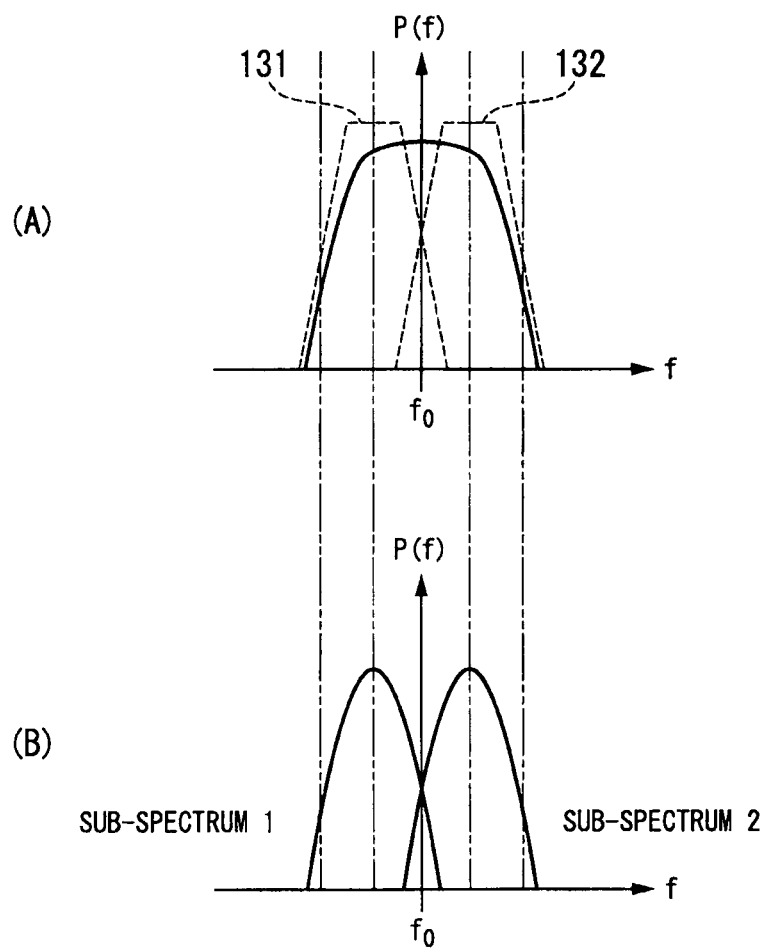
FIG. 3 is a waveform chart that shows the processing of the transmitting device according to the first embodiment.

FIG. 3(A) and FIG. 3(B) are drawings that show the gist of the process when the transmitting device 100a divides by N (N=2) the transmission signal spectrum. Next, using FIG. 2, FIG. 3(A) and FIG. 3(B), each component of the transmitting device 100a and the signal flow shall be described.

The error correction encoding circuit 101 performs error correction encoding on the bit string of the data that is the object of transmission (hereinbelow called "transmission data"), and produces an error correction encoding bit. Specific examples of error correcting encoding include forward error correction (FEC) and turbo codes.

The modulation circuit 102 generates a plurality of modulation symbols by performing a modulation process (mapping process) on the error correction encoding bit. Each modulation symbol is generated as a modulated signal that is waveshaped as shown in FIG. 3(A). Specifically, the modulation circuit 102 performs modulation processing by such modulation techniques as binary phase-shift keying (BPSK), quadrature phase-shift keying (QPSK), octuple phase-shift keying (8PSK) and the like. The modulation circuit 102 outputs the modulated signal that has been generated to the transmission filter bank 103.

The D/A converter 104 converts the output signal from the transmission filter bank 103 to an analog signal (hereinbelow called a "transmission signal"). The transmission signal that has been converted by the D/A converter 104 is sent to the transmission path.

The control circuit 105 controls the transmission filter bank 103, and generates a signal with a portion of the spectrum removed according to a predetermined standard.

Next, the constitution of the transmission filter bank 103 shall be described. The series-parallel conversion circuit 111 performs series-parallel conversion of the modulated signal that has been input. The FFT circuit 112 performs a fast Fourier transform on the series-parallel converted modulated signal, and converts the modulated signal from a signal of the time domain to a signal of the frequency domain. The dividing circuit 113 divides the modulated signal that has been converted to the frequency domain according to the band of the frequency, and generates N sub-spectra whose bands respectively differ. Specifically, as shown by the dashed lines 131 and 132 of FIG. 3(A), the dividing circuit 113 multiplies predetermined coefficients that divide the signal band into N (in the case of FIG. 3(A), N=2) by the modulated signal. By this multiplication, the modulated signal as shown in FIG. 3(B) is divided into N (N=2) sub-spectra.

The switches 114-1 to 114-N are provided at each data line of the N sub-spectra divided by the dividing circuit 113. For example, among the N sub-spectra that were divided by the dividing circuit 113, the switch 114-1 is provided at the data line through which the first sub-spectrum (sub-spectrum 1) is sent. Also, among the N sub-spectra that were divided by the dividing circuit 113, the switch 114-n is provided at the data line through which the nth (n is an integer of 1 to N) sub-spectrum (sub-spectrum n) is sent. One end of the switches 114-1 to 114-N is connected to the dividing circuit 113, while the other end is connected to the adding circuit 116.

The switches 114-1 to 114-N open and close in accordance with control of the control circuit 105. The switches 114-1 to 114-N that correspond to the bands that are judged as being bands to be deleted by the control circuit 105 (hereinbelow called "blocked bands") are put in an opened state in accordance with the control of the control circuit 105 (opening action). On the other hand, the switches 114-1 to 114-N that correspond to the bands that are judged as not to be deleted by the control circuit 105 (hereinbelow called "passbands") are put in an closed state in accordance with control of the control circuit 105 (closing action).

The adding circuit 116 adds together the outputs of the N switches 114-1 to 114-N.

The IFFT circuit 117 performs an inverse fast Fourier transform to convert the signal that has been added by the adding circuit 116 from the frequency domain to the time domain. The parallel-series conversion circuit 118 performs parallel-series conversion of the signal of the time domain that has been outputted from the IFFT circuit 117, and outputs the post-conversion signal to the D/A converter 104.

In the transmission device 100a that is constituted in this way, the sub-spectra that are positioned in the blocked bands are removed by the opening action of the switches 114-1 to 114-N without being input to the adding circuit 116. For that reason, there are no signal components in the blocked bands. By this operation, the transmission device 100a generates a signal of a state in which a portion of the spectrum is removed.

Next, the constitution of the receiving device 200 shall be described. The constitution of the first embodiment and the constitution of the second embodiment differ in terms of the receiving device 200. Hereinbelow, the respective constitutions shall be described in turn.

Figure 4:
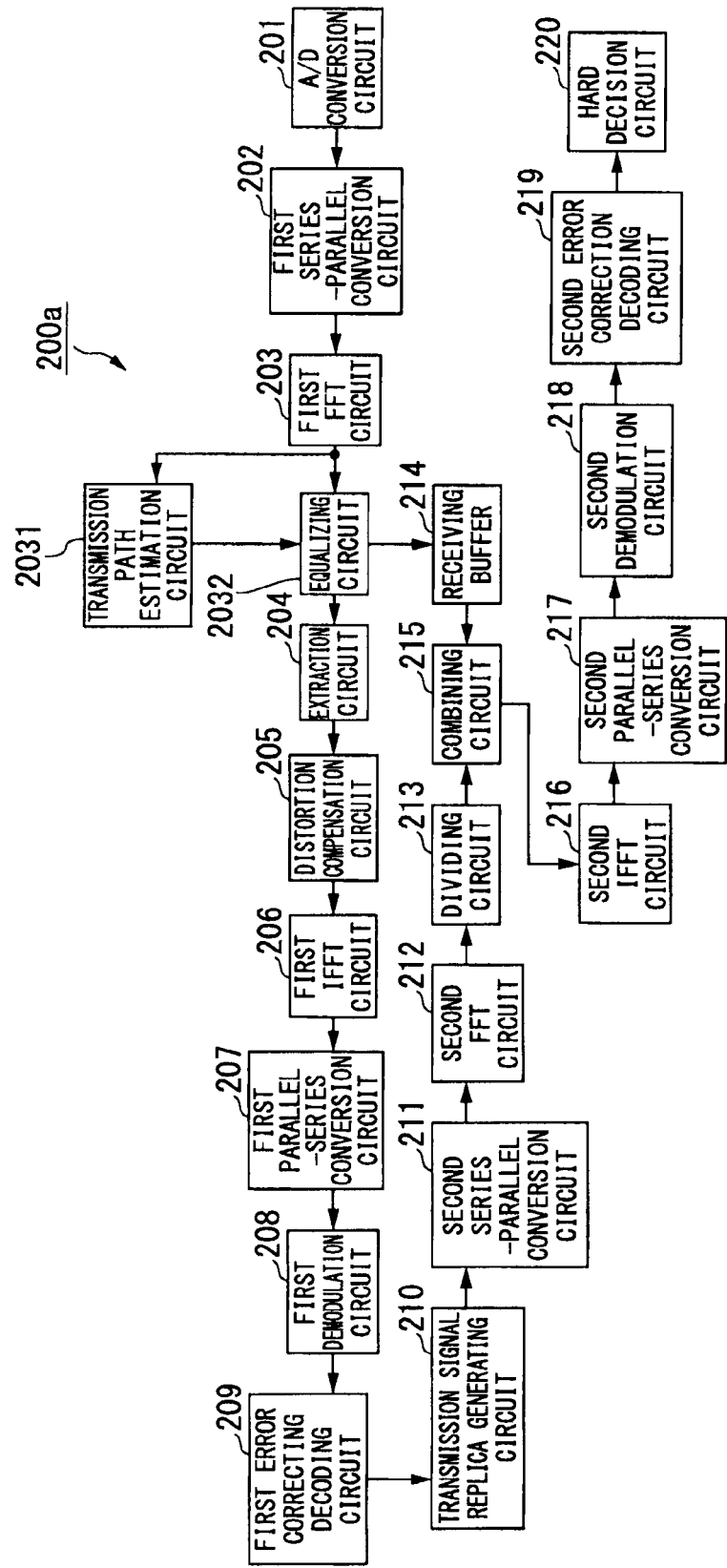
FIG. 4 is a block diagram that shows the first embodiment of the receiving device according to the present invention.

FIG. 4 is a functional block diagram that shows the constitution of the first constitution of the receiving device 200 (receiving device 200a). FIG. 5A to FIG. 5F are drawings that show the signals that are used in the receiving device 200a. The receiving device 200a is provided with an A/D conversion circuit 201, a first series-parallel conversion circuit 202, a first FFT circuit 203, a transmission path estimation circuit 2031, an equalizing circuit 2032, an extraction circuit 204, a distortion compensation circuit 205, a first IFFT circuit 206, a first parallel-series conversion circuit 207, a first demodulation circuit 208, a first error correcting decoding circuit 209, a transmission signal replica generating circuit 210, a second series-parallel conversion circuit 211, a second FFT circuit 212, a dividing circuit 213, a receiving buffer 214, a combining circuit 215, a second IFFT circuit 216, a second parallel-series conversion circuit 217, a second demodulation circuit 218, a second error correction decoding circuit 219, and a hard decision circuit 220.

Figure 5A:
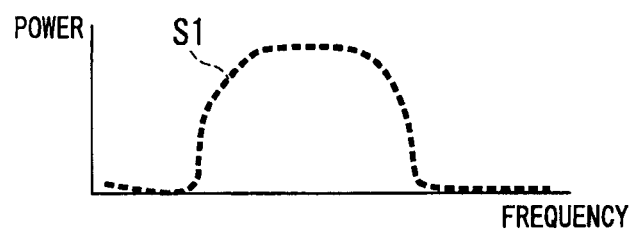
FIG. 5A is a waveform chart that shows the processing of the receiving device according to the first embodiment.

The A/D conversion circuit 201 converts the signal received by the antenna of the receiving device 200a (received signal) into a digital signal. The A/D conversion circuit 201 outputs the received signal after conversion to the first series-parallel conversion circuit 202. FIG. 5A is a drawing that shows the received signal S1.

The first series-parallel conversion circuit 202 carries out series-parallel conversion of the received signal.

The first FFT circuit 203 performs a fast Fourier transform on the received signal on which series-parallel conversion was carried out to convert the received signal from a signal of the frequency domain to a signal of the time-domain.

The transmission path estimation circuit 2031 estimates the transmission path coefficient showing the state of the transmission path from the transmitting device 100a to the receiving device based on the received signal.

The equalizing circuit 2032 removes amplitude phase distortion using the transmission path coefficient estimated by the transmission path estimation circuit 2031. For example, the equalizing circuit 2032 may remove amplitude phase distortion by carrying out multiplication of the inverse of a transmission path coefficient (zero forcing).

The extraction circuit 204 multiplies predetermined coefficients by the received signal that was converted to the frequency domain and extracts N sub-spectra. The predetermined coefficients that the extraction circuit 204 uses are the same as the predetermined coefficients used when the dividing circuit 113 of the transmitting device 100a divides the modulated signal.

Figure 5B:
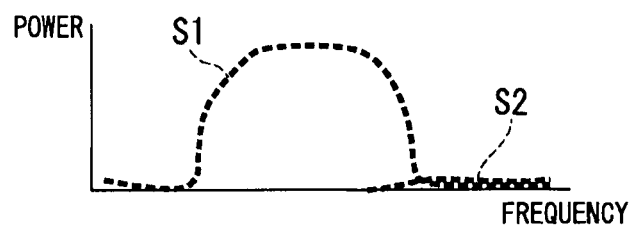
FIG. 5B is a waveform chart that shows the processing of the receiving device according to the first embodiment.

The distortion compensation circuit 205 performs a distortion compensation process on the N sub-spectra that have been extracted. FIG. 5B shows a signal that has been generated by the distortion compensation processing. The distortion compensation processing means processing that performs compensation using a signal whose electrical power is "0" (null value) on a band in which a signal has been removed in the transmitting device 100a (blocked band). In FIG. 5B, a signal S2 in which the electrical power is "0" is newly added to the received signal (S1) that has been subjected to series-parallel conversion. The band of this signal S2 is a blocked band. The noise component in a blocked band is removed by the distortion compensation process, whereby it becomes possible to improve a reception characteristic. And the distortion compensation circuit 205 adds together all the sub-spectra after the distortion compensation process, and generates the combined modulated signal.

The first IFFT circuit 206 performs a fast inverse Fourier transform on the combined modulated signal, to convert the modulated signal from a signal of the frequency domain to a signal of the time domain. The first parallel-series conversion circuit 207 carries out parallel-series conversion on the modulated signal converted into a signal of the time domain. The first demodulation circuit 208 demodulates the modulated signal that has been outputted from the first parallel-series conversion circuit 207 and converts it to a bit string (hard decision) or calculates the likelihood (soft decision).

The first error correction decoding circuit 209 performs an error correction decoding processing on the bit string that has been restored by the first demodulation circuit 208. That is to say, when a portion of the spectrum is removed in the transmitting device 100a, even if the lost signal component is omitted by the error correction decoding process of the first error correction decoding circuit 209, transmitted data can be restored with a certain error rate. The first error correction decoding circuit 209 outputs the result of the error correction decoding processing to the transmission signal replica generating circuit 210.

Figure 5C:
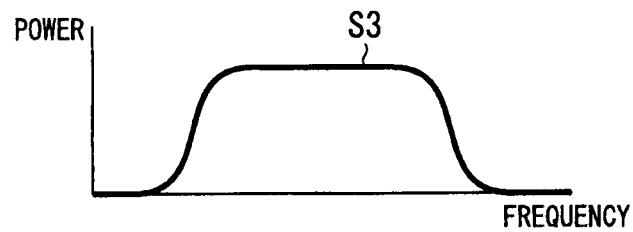
FIG. 5C is a waveform chart that shows the processing of the receiving device according to the first embodiment.

FIG. 5C is a drawing that shows a signal generated by the transmission signal replica generating circuit 210.

The transmission signal replica generating circuit 210 generates a replica of the transmission signal (henceforth called a "transmission signal replica") based on the output of the first error correction decoding circuit 209. However, a transmission signal replica is not a replica of the transmission signal itself that is actually transmitted by the transmitting device 100a. A transmission signal replica is a replica of the transmission signal generated when all of the switches 114-1 to 114-N undergo a closing action in the transmitting device 100a (henceforth called a "full-band transmission signal"). That is, the transmission signal replica generating circuit 210 generates a replica of the transmission signal in the case a blocked band not existing (full-band transmission signal) as the transmission signal replica. S3 of FIG. 5C shows a transmission signal replica. As is clear by comparing FIG. 5A to FIG. 5C, the frequency band that the transmission signal replica S3 occupies becomes the band that sums the frequency band of the received signal S1 and the frequency band in which the null signal S2 has been added together by the distortion compensation processing.

Specifically, when the first error correction decoding circuit 209 is a hard decision type, the transmission signal replica generating circuit 210 is equipped with the same constitution as the error correction encoding circuit 101 and the modulation circuit 102 of the transmitting device 100a, and generates a transmission signal replica. On the other hand, when the first error correction decoding circuit 209 is a soft decision type, a likelihood is outputted from the first error correction decoding circuit 209 to the transmission signal replica signal generating circuit 210. For that reason, in this case the transmission signal replica generating circuit 210 generates a transmission signal replica based on the likelihood (soft replica). For example, in the case of the modulation technique being QPSK, the soft replica signal can be found by the following Equation (1).

$$R = (1/2)^{1/2}\{\tan(\lambda_{Ich}/2) + j \tan h(\lambda_{Qch}/2)\} \quad (1)$$

Here, R expresses the soft replica signal, $\lambda_{Ich}$ expresses the likelihood of a I axis signal, and $\lambda_{Qch}$ expresses the likelihood of a Q axis signal.

The second series-parallel conversion circuit 211 carries out series-parallel conversion of the transmission signal replica generated by the transmission signal replica generating circuit 210. The second FFT circuit 212 performs a fast Fourier transform on the transmission signal replica by which series-parallel conversion is carried out, to convert the transmission signal replica from a signal of the time domain to a signal of the frequency domain.

Figure 5D:
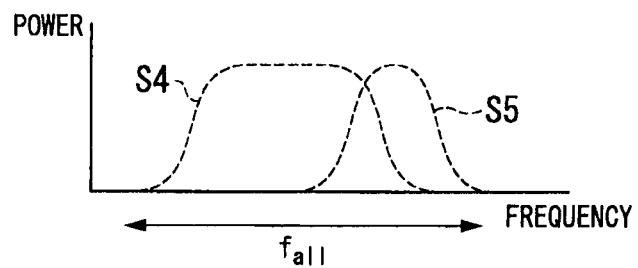
FIG. 5D is a waveform chart that shows the processing of the receiving device according to the first embodiment.
Figure 5E:
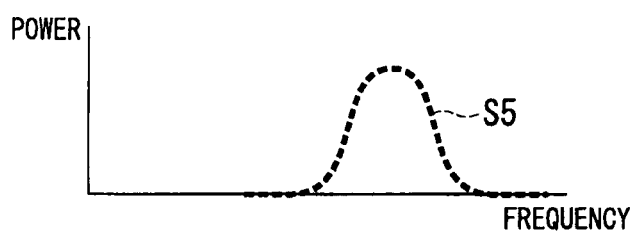
FIG. 5E is a waveform chart that shows the processing of the receiving device according to the first embodiment.

The dividing circuit 213 takes out the signal that consists of only blocked bands from the transmission signal replica that was converted to the frequency domain. FIG. 5D is a drawing that shows the outline of the process of the dividing circuit 213. FIG. 5E is a drawing that shows the signal outputted by the dividing circuit 213. S4 of FIG. 5D expresses the signal located in the passband in the transmitting device 100*a* among the transmission signal replica. S5 of FIG. 5D expresses the signal located in the blocked band in the transmitting device 100*a* among the transmission signal replica. The dividing circuit 213 outputs the signal S5 located in the blocked band in the transmitting device 100*a* among the transmission signal replica, as shown in FIG. 5E.

Hereinbelow, a specific example of the processing of the dividing circuit 213 shall be described. First, the dividing circuit 213 divides a transmission signal replica into N sub-spectra. Next, the dividing circuit 213 takes out the sub-spectra of the bands corresponding to the switches 114-1 to 114-N which have undergone an opening action in the transmitting device 100*a*. The dividing circuit 213 sums together the sub-spectra that have been taken out to generate a replica signal of the bands blocked in the transmitting device 100*a* (henceforth called a "sub-spectrum replica"). The signal S5 shown in FIGS. 5D to 5F is equivalent to a sub-spectrum replica.

A concrete example of the processing by the dividing circuit 213 shall be described. First, the dividing circuit 213 divides the replica signal into N sub-spectra by the same processing as the dividing circuit 113 of the transmitting device 100*a*. The dividing circuit 213 is provided with N switches, and controls the switches by an action that inverts the opening action and closing action of the switches 114-1 to 114-N of the transmitting device 100*a*. That is, a switch that was subjected to the opening action in the transmitting device 100*a* becomes a closing action in the dividing circuit 213, and a switch that was subjected to the closing action in the transmitting device 100*a* becomes an opening action in the dividing circuit 213. The dividing circuit 213 generates the sub-spectrum replica by summing together the outputs of the switches that are controlled in this way.

The receiving buffer 214 buffers for a predetermined time the output of the equalization circuit 2032. The predetermined time is the time until the received signal that is output at the same timing from the equalizing circuit 2032 is processed by the extraction circuit 204, the distortion compensation circuit 205, the first IFFT circuit 206, the first parallel-series conversion circuit 207, the first demodulation circuit 208, the first error correcting decoding circuit 209, the transmission signal replica generating circuit 210, the second series-parallel conversion circuit 211, the second FFT circuit 212, and the dividing circuit 213, and the sub-spectrum replica is output from the dividing circuit 213.

Figure 5F:
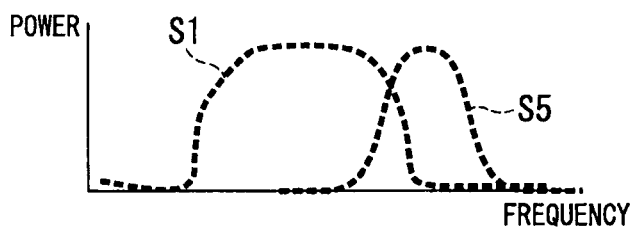
FIG. 5F is a waveform chart that shows the processing of the receiving device according to the first embodiment.

FIG. 5F is a drawing that shows the signal that is generated by the combining circuit 215. The combining circuit 215 combines the received signal S1 that is output from the receiving buffer 214 and the sub-spectrum replica S5 that is output from the dividing circuit 213, and generates a combined signal. At this time, the sub-spectrum replica that is combined with the received signal is the sub-spectrum replica that is generated from this received signal.

The second IFFT circuit 216 performs a fast inverse Fourier transform on the combined signal to convert the combined signal from a signal of the frequency domain to a signal of the time domain. The second parallel-series conversion circuit 217 performs parallel-series conversion on the combined signal that has been converted to a signal of the time domain. The second demodulation circuit 218 demodulates the combined signal that has been output from the second parallel-series conversion circuit 217 and restores the bit string.

The second error correction decoding circuit 219 performs error correction decoding processing on the bit string that has been restored by the second demodulation circuit 218. The second error correction decoding circuit 219 outputs the result of the error correction decoding processing to the hard decision circuit 220. The hard decision circuit 220 performs hard decision processing based on the output of the second error correction decoding circuit 219, and restores the transmission data. Note that in the case of the second error correction decoding circuit 219 being a hard decision type, the hard decision circuit 220 is unnecessary.

In the receiving device 200*a* according to the first constitution that is constituted in this way, by the error correction decoding processing of the first error correction decoding circuit 209, the restoration of transmitted data is performed with an error rate that includes the signal component of the missing portion, from the received signal in which a portion of the signal component is missing. Based on the transmitted data after restoration, a sub-spectrum replica is generated, and by combining the received signal and the sub-spectrum replica, it is equalized to a spectrum that is closer to the spectrum of the full band transmission signal compared to the spectrum of the received signal. Since the decoding is performed using this combined signal, it is possible to improve the error rate.

Figure 6:
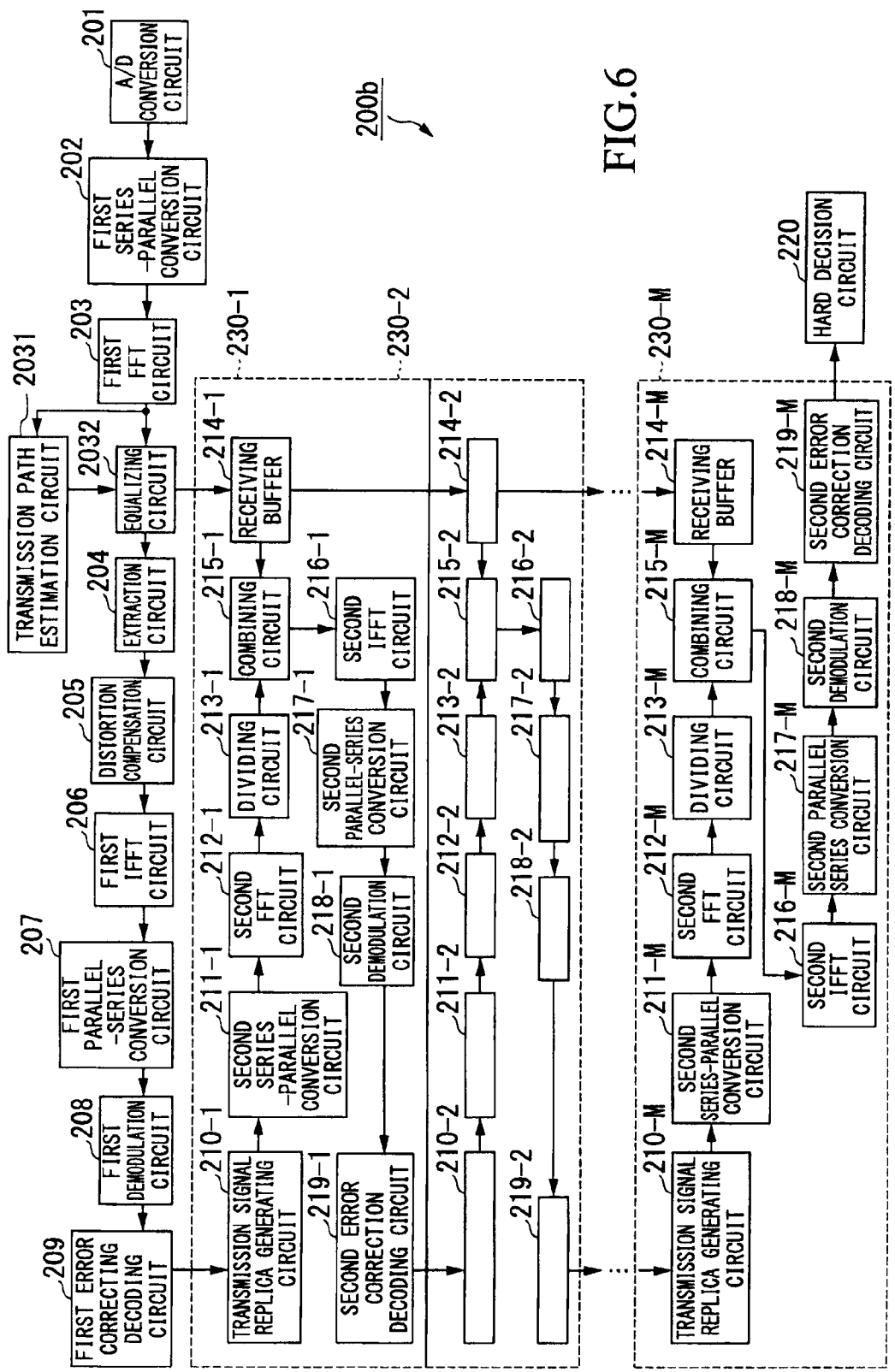
FIG. 6 is a block diagram that shows the second embodiment of the receiving device according to the present invention.

FIG. 6 is a functional block drawing that shows the constitution of the second embodiment of the receiving device 200 (receiving device 200*b*). The receiving device 200*b* according to the second embodiment repeats the replica generating step in the receiving device 200*a* according to the first embodiment (that is to say, the step that regenerates the spectrum that was removed in the receiving device 100*a*) M times (where M is an integer of 2 or more). By this repeated process, regeneration of the spectrum in a blocked band is achieved with greater accuracy.

The receiving device 200*b* is provided with M feedback blocks 230-1 to 230-M. The feedback block 230-*m* (m=1, . . . , M) is provided with a transmission signal replica generating circuit 210-*m*, a second series-parallel conversion circuit 211-*m*, a second FFT circuit 212-*m*, a dividing circuit 213-*m*, a receiving buffer 214-*m*, a combining circuit 215-*m*, a second IFFT circuit 216-*m*, a second parallel-series conversion circuit 217-*m*, a second demodulation circuit 218-*m*, and a second error correction decoding circuit 219-*m*.

Among the various components of the receiving device 200*b* according to the second embodiment, the same names and reference numerals shall be given to the same components as the receiving device 200*a* of the first embodiment, with descriptions thereof being omitted.

As is clear from FIG. 6, in the receiving device 200b, the output of the second error correction decoding circuit 219-m of each feedback block 230-m becomes the input of the transmission signal replica generating circuit 210-m+1 of the feedback block 230-m+1 of the following stage. Moreover, the received signal that is output from the receiving buffer 214-m of each feedback block 230-m becomes the input to the receiving buffer 214-m+1 of the feedback block 230-m+1 of the following stage. The output of the feedback block 230-M of the last stage (Mth) is input to the hard decision circuit 220, and the transmission data are restored.

In the receiving device 200b according to the second embodiment that is constituted in this way, regeneration of the spectrum that is removed in the transmitting device 100a is repeatedly performed based on an error correction function. By this repetition, it is possible to perform decoding using a spectrum that is closer to the spectrum of a full-band transmission signal.

[Evaluation]

Figure 7:
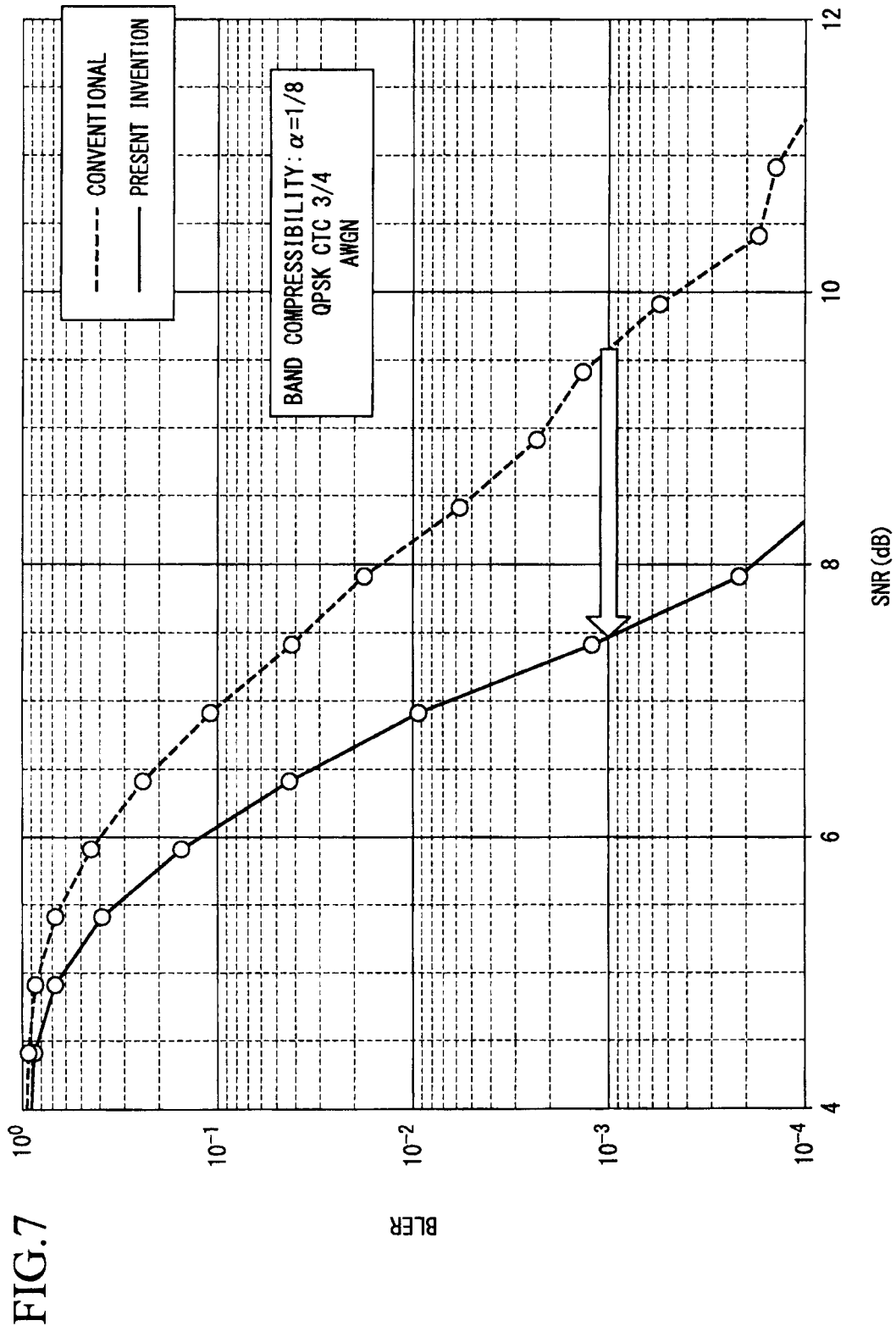
FIG. 7 is a graph that shows the evaluation result of the communication system of the first embodiment of the present invention.

FIG. 7 is a graph that shows the evaluation result of the effectiveness that the communication system 10 exhibits. The transmitting device 100a transmits by deleting one-eighth of the spectrum, and on the receiving side, distortion compensation was performed in the receiving device according to the related art (for example, the receiving device 520) and the receiving device 200 of the present invention. FIG. 7 shows the signal-to-noise ratio vs BLER (Block Error Rate: 1 block is 54 bytes) characteristic in this kind of distortion compensation processing. Regarding the parameters used for computer simulation, QPSK is used as the modulation technique on the transmitting side, with the encoding rate being ¾. Moreover, distortion compensation based on the replica is performed only once in the receiving device 200. That is, FIG. 7 expresses the result of the process by the receiving device 200a of the first embodiment. Comparing the signal-to-noise ratios with a BLER of $10^{-3}$, as shown by the arrow, it is apparent that the receiving device 200 has an approximately 2.1 dB effect compared to the receiving device of the related art.

As long as the switches 114-1 to 114-N are constituted to be able to remove the sub-spectra located in the blocked band, they may have a constitution other than the constitution mentioned above.

Figure 16:
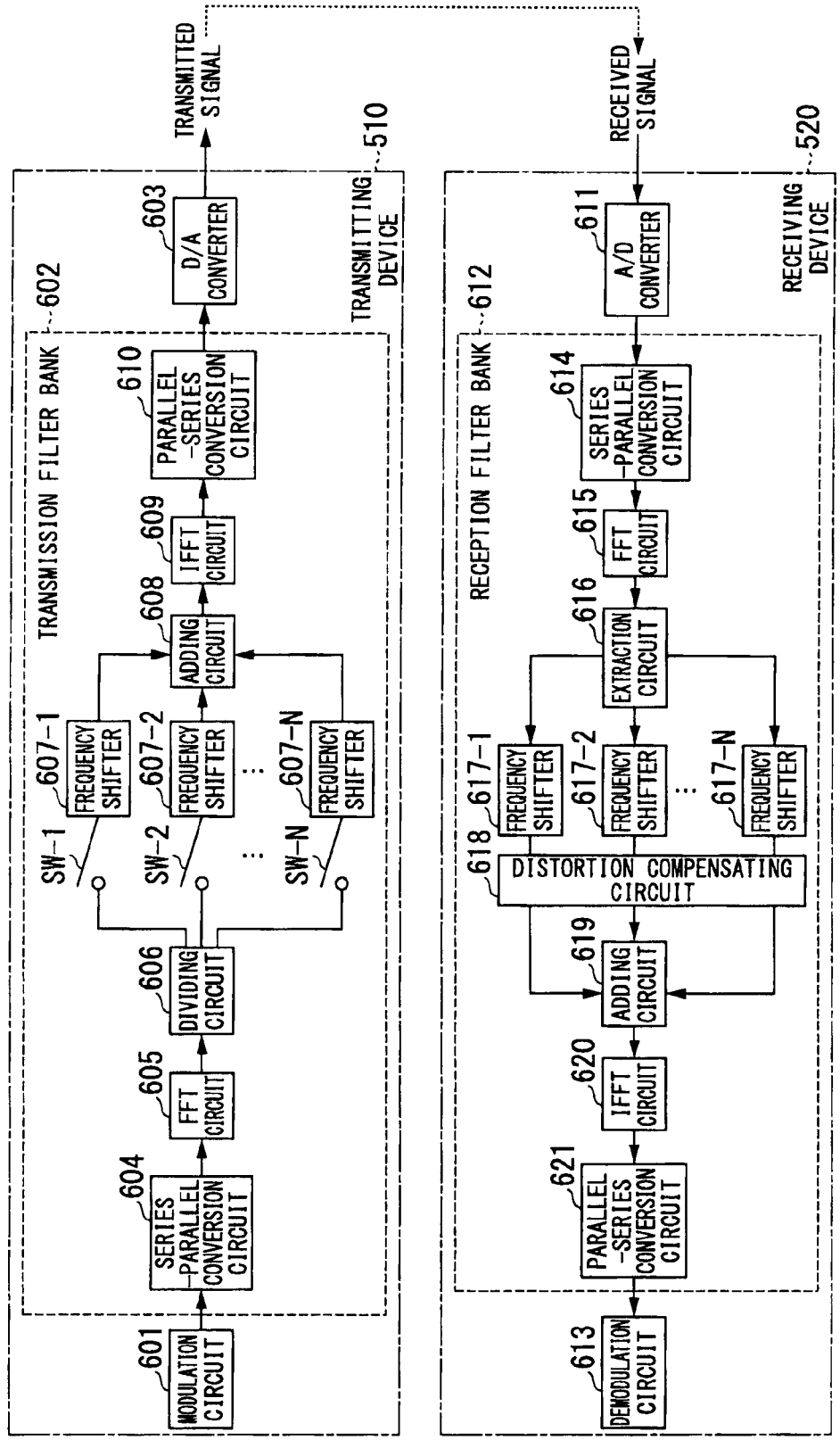
FIG. 16 is a block diagram that shows a communication system according to related art.
Figure 17:
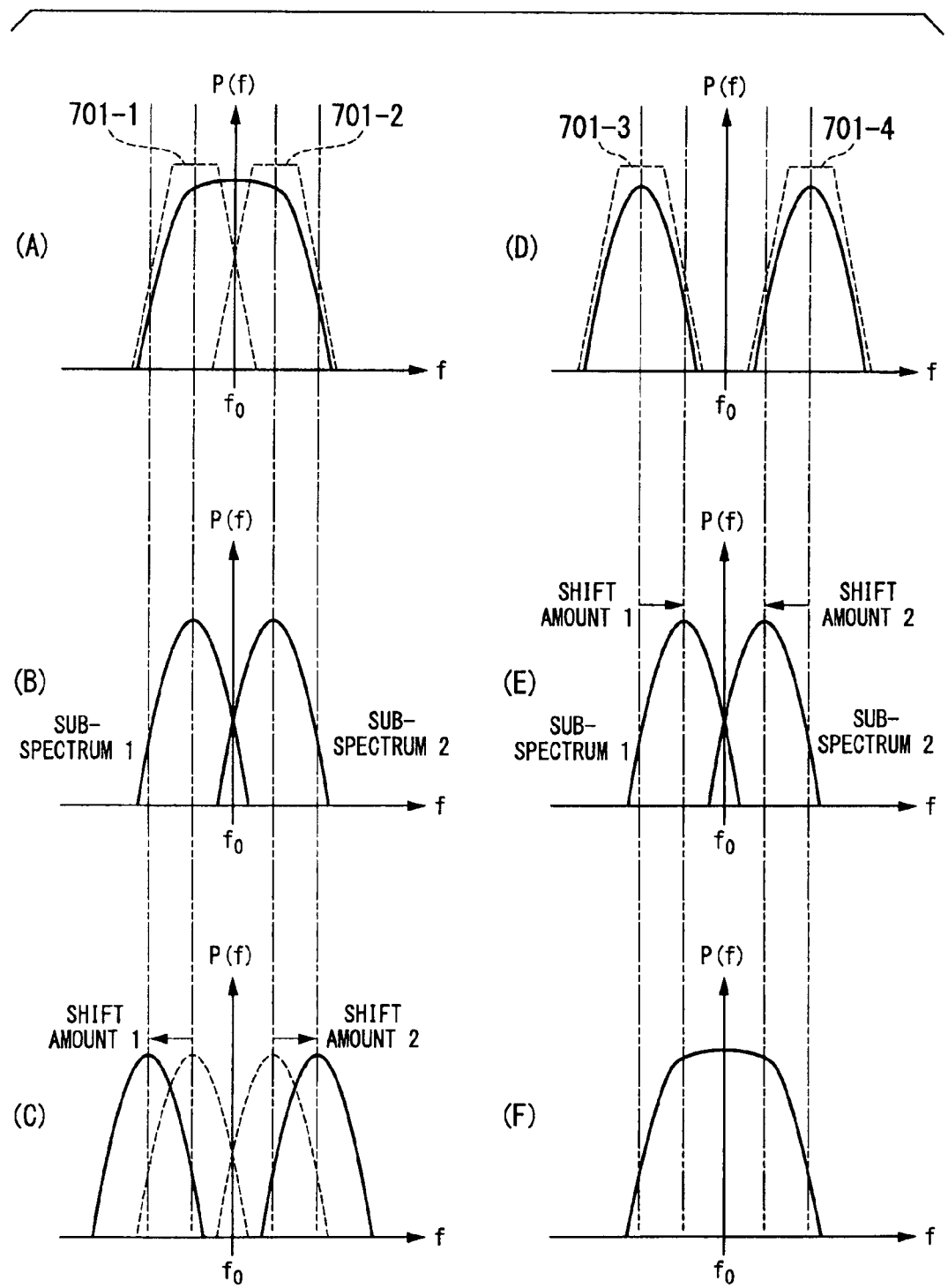
FIG. 17 is a waveform chart that shows the processing the transmitting device and receiving device according to the related art.

Similarly to the transmitting device 500 shown in FIG. 16, the transmitting device 100a may be constituted so as to be provided with N frequency shifters 607-1 to 607-N. In this case, the other end of the switches 114-1 to 114-N is connected to the frequency shifters 607-1 to 607-N corresponding to the respective switches 114-1 to 114-N.

The frequency shifters 607-1 to 607-N arrange the sub-spectra inputted via the switches 114-1 to 114-N in predetermined bands on the frequency axis that are associated in advance. Specifically, for a frequency shifter whose band to which a sub-spectrum is to be arranged corresponds to a blocked band, since the switches 114-1 to 114-N that are upstream have undergone an opening action, a sub-spectrum is not input. Conversely, for a frequency shifter whose band to which a sub-spectrum is to be arranged corresponds to a pass band, since the switches 114-1 to 114-N that are upstream have undergone an closing action, a sub-spectrum is input. In this way, the frequency shifters that correspond to the pass bands arrange the sub-spectra on the predetermined bands on the frequency axis, and output them to the adding circuit 116.

The receiving device of the embodiment can be applied to a transmission signal that is transmitted from this kind of transmitting device.

The following embodiments of this invention relate to distortion compensation on the receiving side, in a communication method that performs transmission by deleting a part of the spectrum of a transmission signal.

In a wireless communication system that uses the receiving device of the first or second embodiments described above, in order to raise the frequency utilization efficiency, transmission is performed by deleting a portion of the spectrum of the transmission signal, and the receiving device restores the transmission signal by performing distortion compensation that involves inserting a "0" in the signal component that corresponds to the band that was deleted at the transmission side. Although frequency utilization efficiency increases according to this method, since a band is removed at the transmitting side, there has been the problem of the signal component of that band being lost.

In the embodiment of this invention described below, N sub-spectra that are divisions of the spectrum are generated in the transmitting device, and transmission is carried out by performing frequency conversion so as to superimpose some of the sub-spectra on the same frequency. Thereby, the frequency utilization efficiency increases by a portion equivalent to the frequency bandwidth that is superimposed, and the signal component itself is not lost.

Meanwhile, in the receiving device, in order to split the superimposed sub-spectra, by generating replicas of the sub-spectra from the received signal, they are removed from the received signal. Thereby, each sub-spectra is generated while being compensated, and by returning the frequencies to the original level and combining, the original signal is restored.

As for the specific characteristic of the method of generating a replica of a sub-spectrum, by dividing the received signal in the same frequency bandwidth as each sub-spectrum in the dividing process at the transmitting device and at a frequency after performing the frequency change of the sub-spectrum, extracting each sub-spectrum (with a superimposed component), and returning them to the original frequency and combining, it is temporarily demodulated by the generated signal. The signal that is obtained by temporary demodulation is remodulated, and by dividing it in the same manner as the transmitting device and carrying out a frequency change, a replica of each sub-spectrum is obtained. By assembling these replicas each N−1 and subtracting from the received signal, N sub-spectra with no superimposed component are obtained. By returning these to their original frequency and combining, it is possible to obtain the transmitted signal with no superimposed component.

Note that in the present embodiment, there is no need to perform additional processing such as spectrum spreading during superimposition of sub-spectra, and so the effect is also obtained of the circuit configuration being simple.

Hereinbelow, the present embodiment shall be described while referring to the drawings. Note that in order to simplify the description, the case shall be described of transmitting a signal only by continuous empty bands, without using empty bands dispersed on the frequency axis.

FIG. 8 is a block diagram that expresses the function configuration of the second embodiment of the transmitting device 100b. The transmitting device 100b is provided with a first encoding circuit 2100, a first modulation circuit 2101, a transmission filter bank 2102, and D/A converter 2103. The transmission filter bank 2102 is provided with a first series-parallel conversion circuit 2106, a first FFT (fast Fourier transform) circuit 2107, a first dividing circuit 2108, first frequency conversion circuits 2109 to 2109-N, a first combining circuit 2110, a first IFFT (inverse fast Fourier transform) circuit 2111, and a first parallel-series conversion circuit 2112.

Next, the action of the transmitting device 100b shall be described.

Figure 9A:
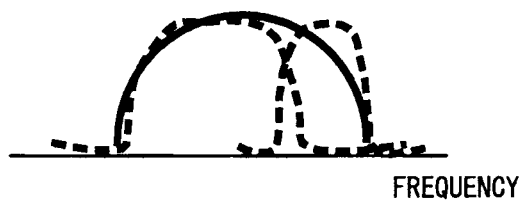
FIG. 9A is a waveform chart that shows the processing of the transmitting device according to the second embodiment.
Figure 9B:
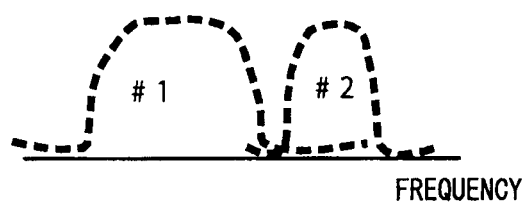
FIG. 9B is a waveform chart that shows the processing of the transmitting device according to the second embodiment.
Figure 9C:
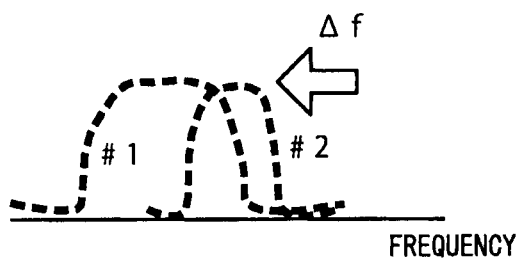
FIG. 9C is a waveform chart that shows the processing of the transmitting device according to the second embodiment.

FIG. 9A to FIG. 9C are conceptual drawings that show the processing when the transmitting device 100b according to the second embodiment divides by N (N=2) the transmission signal spectrum. The first encoding circuit 2100 and the first modulation circuit 2101 generate a plurality of modulation symbols by performing error correcting encoding processing and modulation processing (symbol mapping) on the data that is to be transmitted. Each modulation symbol is generated as a modulated signal that is waveform shaped as shown in FIG. 9A. Specifically, the first modulation circuit 2101 performs modulation processing by such modulation techniques as BPSK (Binary Phase Shift Keying), QPSK (Quadrature Phase Shift Keying), 8PSK (Octuple Phase Shift Keying) and the like. The first modulation circuit 2101 outputs the generated modulated signal to the transmission filter bank 2102.

Next, the operation of the transmission filter bank 2102 shall be described. The first series-parallel conversion circuit 2106 carries out series-parallel conversion on the modulated signal that has been input. The first FFT circuit 2107 performs a fast Fourier transform on the modulated signals that have undergone the series-parallel conversion to convert the modulated signals from signals of the time domain to signals of the frequency domain. The first dividing circuit 2108 divides into arbitrary frequency band components the modulated signals that have been converted to the frequency domain, and generates N (N=2, 3, . . . ) sub-spectra whose bands differ respectively.

Specifically, as shown in FIG. 9A the first dividing circuit 2108 multiplies filter coefficients (filter coefficients of the same number as the number of sub-spectra to be extracted) that divide (extract) the signal band into N (N=2 in the case of FIG. 9A) by the modulated signal. By multiplying each filter coefficient by the modulated signal, as shown in FIG. 9B, the modulated signal is divided into N (N=2) sub-spectra #1 and #2.

The first frequency conversion circuits 2109-1 to 2109-N convert by M the central frequencies so that each of the N sub-spectra are partially superimposed on the frequency axis. For example, as shown in FIG. 9C, the N sub-spectra (N=2) partially overlap. The first combining circuit 2110 adds together the N sub-spectra that have been frequency converted. The first IFFT circuit 2111 performs a fast inverse Fourier transform to convert the sub-spectra that have been combined after frequency conversion from a signal of the frequency domain to a signal of the time domain. The first parallel-series conversion circuit 2112 carries out parallel-series conversion of the signal of the time-domain that has been output from the first IFFT circuit 2111, and outputs the signal after conversion to the D/A converter 2103. The D/A converter 2103 converts the output signal from the transmission filter bank into an analog signal (henceforth called a "transmission signal"). The transmission signal that has been converted by the D/A converter 2103 is sent out to the transmission path.

In the transmitting device 100b that is constituted in this way, some of the sub-spectra are superimposed by the first frequency conversion circuits 2109-1 to 2109-N. For this reason, the frequency bands that the transmission signal occupies become small in accordance with the superimposed bandwidth.

Next, the constitution of the receiving device 200c shall be described.

FIG. 10 is a block drawing that shows the functional constitution of the third embodiment of the receiving device 200c. The receiving device 200c is constituted from an A/D conversion circuit 2200, a reception filter bank 2201, a first demodulation circuit 2202, a first decoding circuit 2203, a re-encoding circuit 2204, a re-modulation circuit 2205, a sub-spectrum replica generating filter bank 2206, a receiving buffer circuit 2207, subtracting circuits 2209-1 to 2209-N, a combining filter bank 2213, a second demodulation circuit 2214, and a second decoding circuit 2215.

Figure 10A:
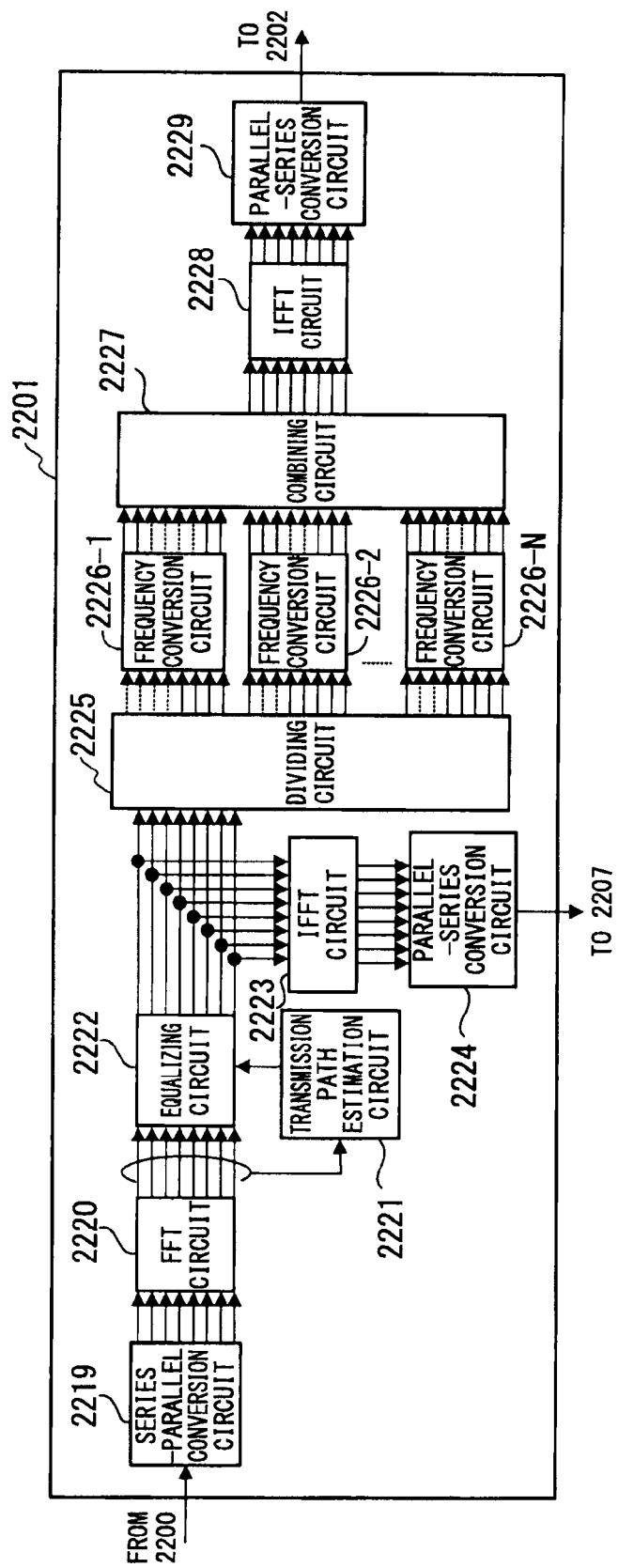
FIG. 10A is a block diagram that shows a reception filter bank 2201 shown in FIG. 10.

As shown in FIG. 10A, the reception filter bank 2201 is constituted from a second series-parallel conversion circuit 2219, a second FFT circuit 2220, a transmission path estimation circuit 2221, an equalizing circuit 2222, a second IFFT circuit 2223, a second parallel-series conversion circuit 2224, a second dividing circuit 2225, second frequency conversion circuits 2226-1-2226-N, a second combining circuit 2227, a second IFFT circuit 2228, and a third parallel-series conversion circuit 2229.

Figure 10B:
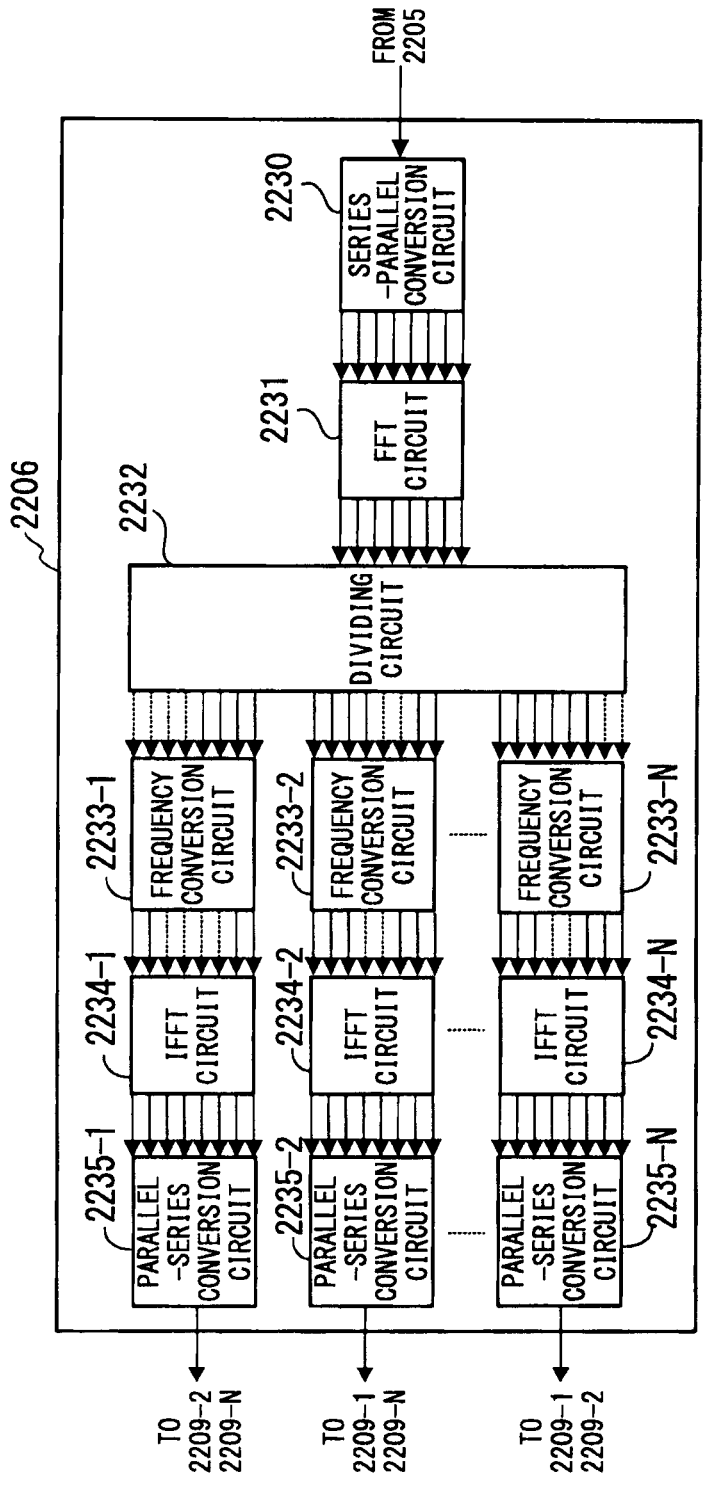
FIG. 10B is a block diagram that shows a sub-spectrum replica generating filter bank 2206 shown in FIG. 10.
Figure 10C:
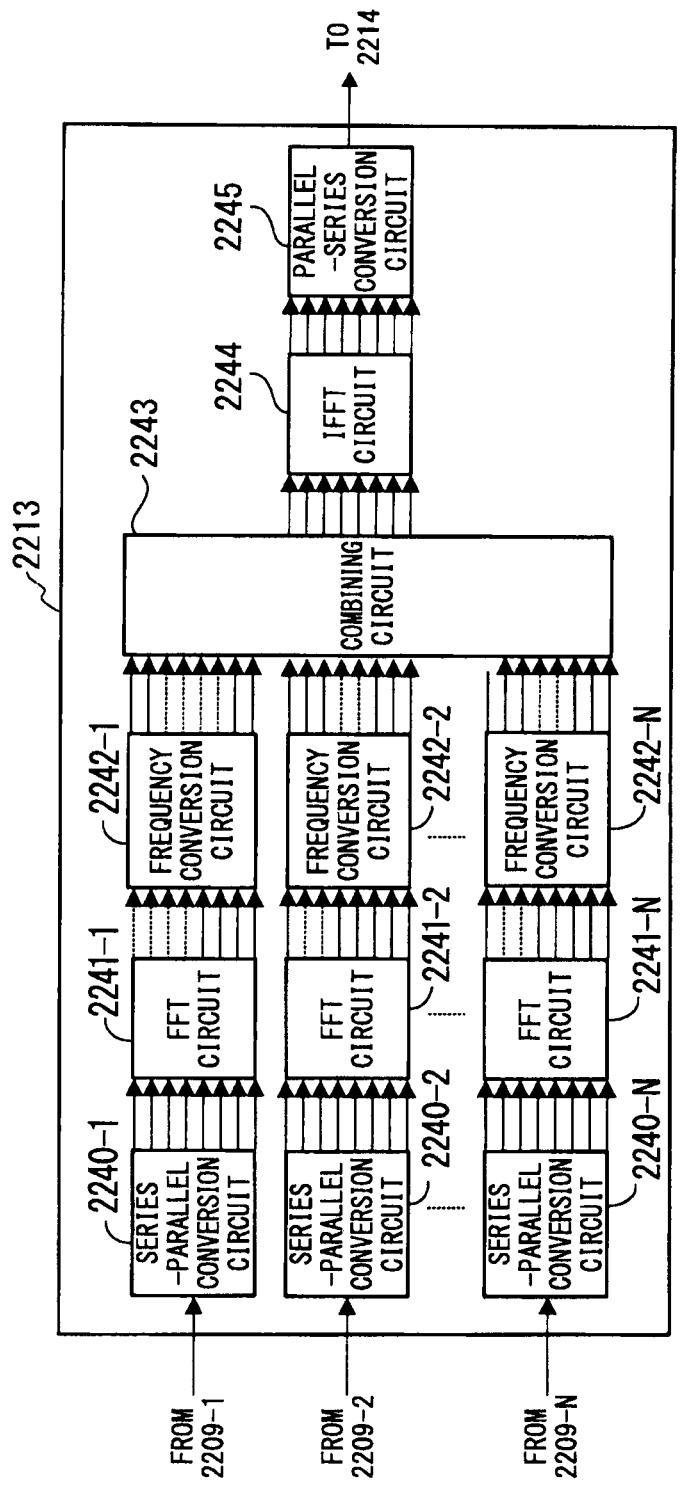
FIG. 10C is a block diagram that shows a combining filter bank 2213 shown in FIG. 10.

As shown in FIG. 10B, the sub-spectrum replica generating filter bank 2206 is constituted from a third series-parallel conversion circuit 2230, a third FFT circuit 2231, a third dividing circuit 2232, third frequency conversion circuits 2233-1 to 2233-N, fourth IFFT circuits 2234-1 to 2234-N, and fourth parallel-series conversion circuits 2235-1-2235-N. As shown in FIG. 10C, the combining filter bank 2213 is constituted from fourth series-parallel conversion circuits 2240-1 to 2240-N, fourth FFT circuits 2241-1 to 2241-N, fourth frequency conversion circuits 2242-1 to 2242-N, a third combining circuit 2243, a fifth IFFT circuit 2244, and a fifth parallel-series conversion circuit 2245.

Next, the operation of the receiving device 200c shall be described.

Figure 11A:
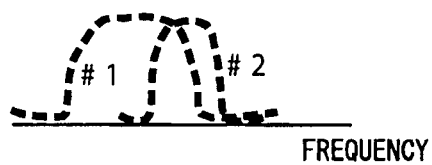
FIG. 11A is a waveform chart that shows the processing of the receiving device according to the third embodiment.

FIGS. 11A to 11H are conceptual diagrams showing the signal used in the receiving device 200c according to the third embodiment. First, for a received signal, the receiving device 200c returns a superimposed sub-spectrum to its original frequency, and performs temporary demodulation and decoding using this. The A/D conversion circuit 2200 converts the signal that has been received by the antenna of the receiving device 200c (not illustrated) (received signal) into a digital signal. The A/D conversion circuit 2200 outputs the received signal after conversion to the reception filter bank 2201 (FIG. 11A).

In the reception filter bank 2201, the second series-parallel conversion circuit 2219 carries out series-parallel conversion of the received signal. The second FFT circuit 2220 performs a fast Fourier transform on the received signals that have undergone series-parallel conversion, and converts the received signals from signals of the time domain to signals of frequency domain. The transmission path estimation circuit 2221 estimates a transmission path coefficient using known signals, such as a training signal, a reference signal, and a sounding signal. The equalizing circuit 2222 compensates the amplitude phase distortion of the received signals by frequency-domain equalization processing using the transmission path coefficient estimated in the transmission path estimation circuit 2221. The Zero Forcing method and the like are known examples of frequency domain equalization processing. The equalized signals are outputted to the second IFFT circuit 2223 and the second dividing circuit 2225. The second IFFT circuit 2223 carries out a fast inverse Fourier transform on the received signals after frequency domain equalization, to return them to time-domain signals. The second parallel-series conversion circuit 2224 carries out parallel-series conversion of the received signals that have been subjected to inverse Fourier transform, and outputs it to the receiving buffer circuit 2207.

Meanwhile, the second dividing circuit 2225 multiplies filter coefficients corresponding to the filter coefficients used in order to generate the N sub-spectra in the transmitting device 100b by the received signal that has been subjected to frequency-domain equalization to divide it into sub-spectra. Here, the difference with the sub-spectra generation in the transmission filter bank 2102 is using filter coefficients that shift the frequency similarly to the frequency conversion in the first frequency conversion circuits 2109-1 to 2109-N of the transmission filter bank 2102. Namely, since each sub-spectrum that is generated by multiplying a filter coefficient is transmitted after the frequency conversion is performed, in order to generate each sub-spectrum from the received signal, it is necessary to use the frequency-shifted one and not the filter coefficient in the transmission filter bank 2102.

Figure 11B:
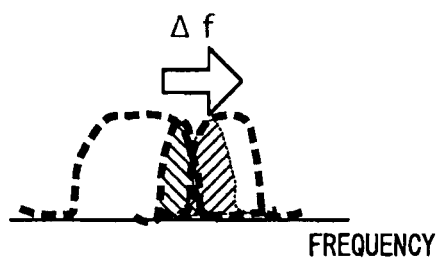
FIG. 11B is a waveform chart that shows the processing of the receiving device according to the third embodiment.
Figure 11C:
FIG. 11C is a waveform chart that shows the processing of the receiving device according to the third embodiment.

The second frequency conversion circuits 2226-1 to 2226-N return each sub-spectrum to the original frequency by the reverse operation of the frequency conversion in the first frequency conversion circuits 2109-1 to 2109-N of the transmission filter bank 2102 (change the frequency only by $-\Delta f$) (FIG. 11B). The second combining circuit 2227 adds and combines the equalized sub-spectra of N channels that have been frequency converted (FIG. 11C). The second IFFT circuit 2228 carries out a fast inverse Fourier transform to convert the signals that have been added together by the second combining circuit 2227 from a signal of the frequency domain to a signal of the time domain. The third parallel-series conversion circuit 2229 carries out parallel series conversion of the time-domain signal outputted from the third IFFT circuit 2228.

The output of the third parallel-series conversion circuit 2229 in the reception filter bank 2201 is passed to the first demodulation circuit 2202, and the first demodulation circuit 2202 and the first decoding circuit 2203 perform temporary demodulation and decoding of the time-domain signal.

Figure 11D:
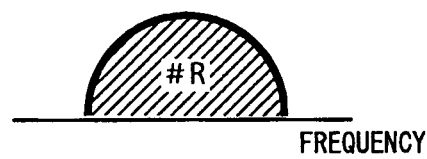
FIG. 11D is a waveform chart that shows the processing of the receiving device according to the third embodiment.

The re-encoding circuit 2204 and the re-modulation circuit 2205 generate a plurality of modulation symbols by performing re-encoding process and re-modulation process (mapping process) on the data that was acquired by temporary demodulation and decoding (FIG. 11D). In the case of using a soft decision value (likelihood) as a temporary demodulation decoding value, it is also possible to directly generate a soft decision replica signal without passing through the re-encoding process. The transmission replica signal that is generated in this way is delivered to the sub-spectrum replica generating filter bank 2206.

Figure 11E:
FIG. 11E is a waveform chart that shows the processing of the receiving device according to the third embodiment.

The sub-spectrum replica generating filter bank 2206 has the same constitution as the transmission filter bank 2102 in the transmitting device 100b. The third series-parallel conversion circuit 2230 carries out series-parallel conversion of the signal. The third FFT circuit 2231 performs a fast Fourier transform on the re-modulated signals that underwent series-parallel conversion, to convert the re-modulated signals from signals of the time domain to signals of the frequency domain. The second dividing circuit 2232 multiplies the replica signals of the frequency domain that were outputted by the third FFT circuit 2231 and filter coefficients that correspond to the filter coefficients that were used for generating the N sub-spectra in the first dividing circuit 2108 of the transmitting device 100b, to thereby generate N transmission sub-spectrum replicas (FIG. 11E).

The third frequency conversion circuits 2233-1 to 2233-N perform sub-spectrum replica frequency conversion on each sub-spectrum replica in the same manner as the first frequency conversion circuits 2109-1 to 2109-N of the transmitting device 100b. The fourth IFFT circuits 2234-1 to 2234-N perform a fast inverse Fourier transform to convert the N channel output signals of the third frequency conversion circuits 2233-1 to 2233-N from signals of the frequency domain to signals of the time domain. The fourth parallel-series conversion circuits 2235-1 to 2235-N carry out parallel-series conversion of the signals of the time-domain outputted from the fourth IFFT circuits 2234-1 to 2234-N, to produce the output of the sub-spectrum replica generating filter bank 2206.

The receiving buffer circuit 2207 holds the output of the second parallel-series conversion circuit 2224 in the receive filter bank 2201, and plays the role of a delay device that absorbs the processing delay time from the second dividing circuit 2225 to the sub-spectrum replica generating filter bank 2206.

Figure 11F:
FIG. 11F is a waveform chart that shows the processing of the receiving device according to the third embodiment.
Figure 11G:
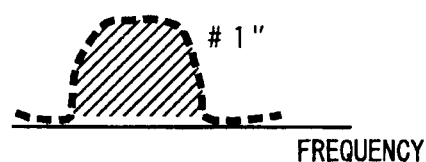
FIG. 11G is a waveform chart that shows the processing of the receiving device according to the third embodiment.

The subtracting circuits 2209-1 to 2209-N are respectively provided in N channels, and from the received signal that is stored in the receiving buffer circuit 2207 select and subtract a different N−1 sub-spectrum replica among the aforementioned N sub-spectrum replicas. By this process, the one remaining sub-spectrum that corresponds to the N−1 sub-spectrum replica that was not subtracted is extracted from the signal that was stored in the receiving buffer circuit 2207 (FIG. 11F, FIG. 11G).

In the combining filter bank 2213, the fourth series-parallel conversion circuits 2240-1 to 2240-N perform series-parallel conversion of the N channel signals that are the output of the aforementioned subtractors 2209-1 to 2209-N. The fourth FFT circuits 2241-1 to 2241-N carry out a fast Fourier transform on the received signals that have been subjected to series-parallel conversion, and convert each output of the fourth series-parallel conversion circuits 2240-1 to 2240-N from a signal of the time domain to a signal of the frequency domain.

Figure 11H:
FIG. 11H is a waveform chart that shows the processing of the receiving device according to the third embodiment.

The fourth frequency conversion circuits 2242-1 to 2242-N perform the same frequency conversion as the frequency conversion in the second frequency conversion circuits 2226-1 to 2226-N in the reception filter bank 2201. The third combining circuit 2243 adds and combines the N-channel signals that were frequency converted in the fourth frequency conversion circuits 2242-1 to 2242-N (FIG. 11H). The fifth IFFT circuit 2244 carries out a fast inverse Fourier transform to convert the signals that were added together by the third combining circuit 2243 from signals of the frequency domain to signals of the time domain. The fifth parallel-series conversion circuit 2245 carries out parallel-series conversion of the signal of the time domain that is output from the fifth IFFT circuit 2244, to produce the output of the combining filter bank 2213.

The second demodulation circuit 2214 and the second decoding circuit 2215 respectively demodulate and decode the time-domain signal.

According to the receiving device of the third embodiment, by subtracting the combination of N−1 sub-spectrum replicas from the received signal after equalization, the N sub-spectra are extracted, and by combining and demodulating/decoding them, it is possible to perform division and compensation of the sub-spectra that are superimposed in the transmitting device 100b.

Note that in the aforementioned receiving device according to the third embodiment, by re-inputting the decoding result of the second decoding circuit 2215 to the re-encoding circuit 2204, and repeating the processing from the re-encoding circuit 2204 to the second decoding circuit 2215, the residual interference is reduced, and it is possible to improve the division accuracy, that is, the reception characteristic.

Next, yet another embodiment of the present invention shall be described.

In the embodiment that is described hereinbelow, N sub-spectra that have divided the spectrum are generated in the transmitting device. Next, those sub-spectra other than the sub-spectrum with the widest band undergo spectrum spreading in a range that fits with the same bandwidth, are superimposed by frequency conversion to the same frequency and then transmitted. While the information transmission rate is constant, since the frequency bandwidth of the sub-spectrum with the widest band becomes the occupied bandwidth, the frequency utilization efficiency increases, and the signal component itself is not lost.

On the other hand, in the receiving device, in order to divide the superimposed sub-spectra, replicas of the sub-spectra are generated from the received signal, and removed from the received signal. Thereby, each sub-spectrum is regenerated while being compensated, and by returning them to their original frequencies and combining, the original signal is restored.

The specific characteristic of the method of generating a sub-spectrum replica is first performing temporary modulation on the main component signal of the received signal. By the temporary demodulation, the signal component appears also in the frequency component that the other sub-spectra occupied in the transmitted device. By re-modulating the signal that was obtained by temporary demodulation, and dividing it in the same way as the transmitting device, performing spreading processing and frequency changing, a replica of each sub-spectrum is obtained. By combining these replicas each N−1 and subtracting from the received signal, the sub-spectrum N with no superimposed component is obtained. For the sub-spectrum that were subjected to the spreading process, reverse spreading is carried out, and by returning to their original frequencies and combining, it is possible to obtain the transmitted signal with no superimposed components.

Note that in the following embodiment, due to the components that are spread and superimposed, that is, the sub-spectrum spreading of the sub-spectra other than the widest sub-spectrum, they become interference on the level of noise for the main component, that the sub-spectrum with the widest band, and so the accuracy of the replicas generated on the receiving side increase. That is to say, the effect is obtained of the possibility of being able to restore increasing.

Figure 12:
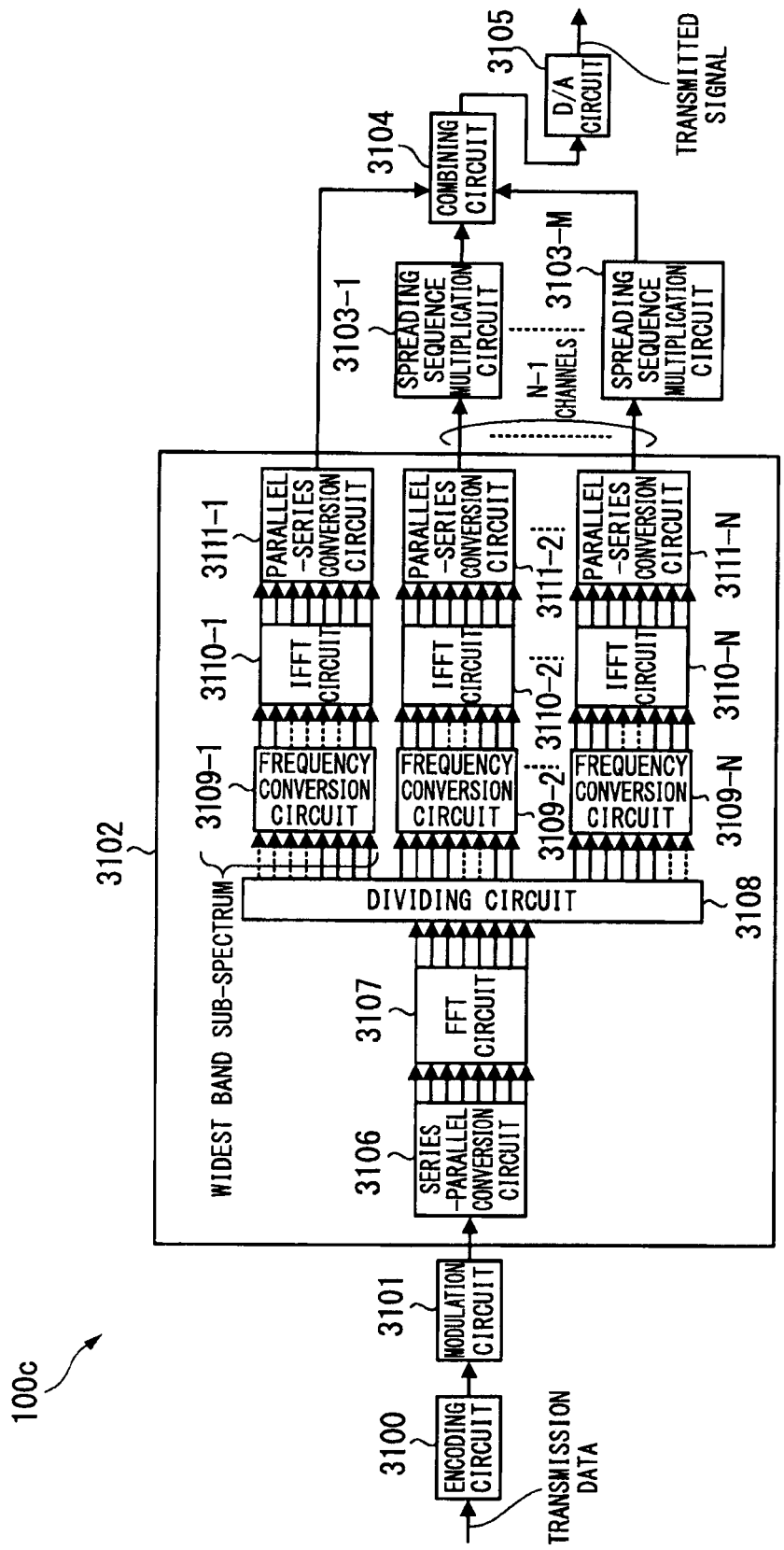
FIG. 12 is a block diagram that shows the third embodiment of the transmitting device according to the present invention.

FIG. 12 is a block diagram that shows the functional constitution of the third embodiment of the transmitting device 100c. The transmitting device 100c is equipped with a first encoding circuit 3100, a first modulation circuit 3101, a transmission filter bank 3102, first spreading sequence multiplication circuits 3103-1 to 3103-M (M=N−1), a first combing circuit 3104, and a D/A converter 3105. The transmission filter bank 3102 is provided with a first series-parallel conversion circuit 3106, a first FFT (fast Fourier transform) circuit 3107, a first dividing circuit 3108, first frequency conversion circuits 3109-1 to 3109-N, first IFFT (inverse fast Fourier transform) circuits 3110-1 to 3110-N, and first parallel-series conversion circuits 3111-1 to 3111-N.

Next, the operation of the transmitting device 100c shall be described.

Figure 13A:
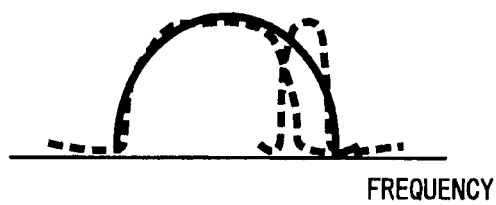
FIG. 13A is a waveform chart that shows the processing of the transmitting device according to the third embodiment.

FIG. 13A to FIG. 13D are conceptual drawings that show the processing when the transmitting device 100c according to the third embodiment divides by N (N=2) the transmission signal spectrum. The first encoding circuit 3100 and the first modulation circuit 3101 generate a plurality of modulation symbols by performing error correcting encoding processing and modulation processing (symbol mapping) on the data that is the object of transmission. Each modulation symbol is generated as a modulated signal that is waveform shaped as shown in FIG. 13A. Specifically, the first modulation circuit 3101 performs modulation processing by such modulation techniques as BPSK (Binary Phase Shift Keying), QPSK (Quadrature Phase Shift Keying), 8PSK (Octuple Phase Shift Keying) and the like. The first modulation circuit 3101 outputs the generated modulated signal to the transmission filter bank 3102.

The transmission filter bank 3102 outputs N-divided sub-spectra. The first series-parallel conversion circuit 3106 carries out series-parallel conversion on the modulated signal that has been input. The first FFT circuit 3107 performs a fast Fourier transform on the modulated signals to which the series-parallel conversion has been carried out to convert the modulated signals from signals of the time domain to signals of the frequency domain. The first dividing circuit 3108 divides into arbitrary frequency band components the modulated signals that have been converted to the frequency domain, and generates N (N=2, 3, . . . ) sub-spectra whose bands differ respectively.

Figure 13B:
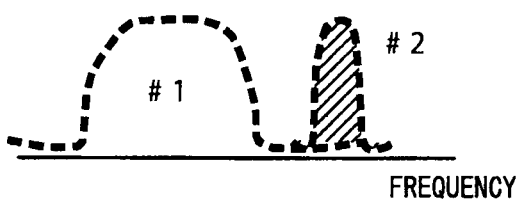
FIG. 13B is a waveform chart that shows the processing of the transmitting device according to the third embodiment.

Specifically, as shown in FIG. 13A the first dividing circuit 3108 multiplies filter coefficients (filter coefficients of the same number as the number of sub-spectra to be extracted) that divide (extract) the signal band into N (N=2 in the case of FIG. 13A) by the modulated signal. By multiplying the filter coefficients by the modulated signal, as shown in FIG. 13B, the modulated signal is divided into N (N=2) sub-spectra #1 and #2.

The first frequency conversion circuits 3109-1 to 3109-N perform frequency conversion on the central frequency of each of the N sub-spectra so as to be the same as the transmission central frequency of the sub-spectrum that has the widest occupied bandwidth. The first IFFT circuits 3110-1 to 3110-N perform a fast inverse Fourier transform to convert the sub-spectra after frequency conversion from signals of the frequency domain to signals of the time domain. The first parallel-series conversion circuits 3111-1 to 3111-N carry out parallel-series conversion on the time-domain signals output from the first IFFT circuits 3110-1 to 3110-N, and output the signals after conversion.

Figure 13C:
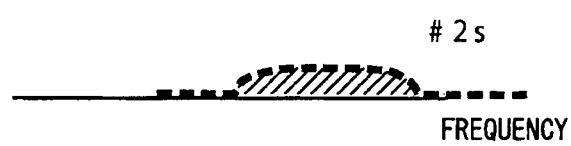
FIG. 13C is a waveform chart that shows the processing of the transmitting device according to the third embodiment.
Figure 13D:
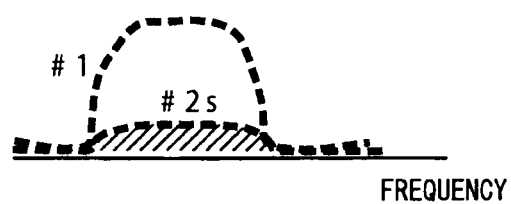
FIG. 13D is a waveform chart that shows the processing of the transmitting device according to the third embodiment.

Among the N sub-spectra that are output from the transmission filter bank 3102, the N−1 channel sub-spectra excluding the sub-spectrum with the widest occupied frequency bandwidth are input to the first spreading sequence multiplication circuits 3103-1 to 3103-M (M=N−1), and as shown in FIG. 13C, each occupied band is expanded to be the same as the widest occupied frequency bandwidth or in a range that fits within it (refer to sub-spectrum #2s).

Note as the spreading code that is used for each of the N−1 channels, a code with an excellent cross-correlation characteristic is desirable, for example use of the Hadamard codes or Gold codes and the like is assumed. Also, when setting the sub-spectrum with the widest occupied bandwidth to sub-spectrum #1, when the Nyquist band thereof is BW0, and the Nyquist bands of the other sub-spectra k (k=2=N) are BWk, the spread sequence chip rate used for the first spread sequence must satisfy $(1/BWk) \times [BW0/BWk]$. Here, [x] is the greatest integer that does not exceed x. That is, for the sub-spectra k, the occupied bandwidths thereof are expanded to a maximum [BW0/BWk] times by the first spreading sequence multiplication circuits 3103-1 to 3103-M.

The first combining circuit 3104 combines the sub-spectrum #1 with the widest occupied frequency bandwidth and the other N−1 sub-spectrum #2 whose occupied band is expanded by the spreading code. As a result, as shown in FIG.

13D, the N−1 sub-spectrum#2s that has been spread is superimposed on the sub-spectrum #1 that has the widest occupied bandwidth.

The D/A converter 3105 converts the output signal from the transmission filter bank 3102 to an analog signal (hereinbelow called a "transmitted signal"). The transmitted signal that was converted by the D/A converter 3105 is sent out to the transmission path.

In the transmitting device 100c that is constituted in this way, the occupied bandwidths of the N−1 sub-spectra are spread by respectively differing spreading codes by the first spreading sequence multiplication circuits 3103-1 to 3103-M, and spread to the same bandwidth as the sub-spectrum with the lower power density and widest frequency band, and all of the sub-spectra are superimposed by the first combining circuit 3104. For this reason, the frequency band that the transmission signal occupies can be narrowed to the same bandwidth as the sub-spectrum with the widest frequency bandwidth.

FIG. 14 is a block figure that shows the function configuration of the fourth embodiment of the receiving device 200d. The receiving device 200d is provided with an A/D conversion circuit 3200, a reception filter bank 3201, a first demodulation circuit 3202, a first decoding circuit 3203, a re-encoding circuit 3204, a re-modulation circuit 3205, the sub-spectrum replica generating filter bank 3206, a receiving buffer circuit 3207, second spreading sequence multiplication circuits 3208-1 to 3208-M (M=N−1), subtracting circuits 3209-1 to 3209-N, third spreading sequence multiplication circuits 3212-1 to 3212-M, a combining filter bank 3213, a second demodulation circuit 3214, and a second decoding circuit 3215.

Figure 14A:
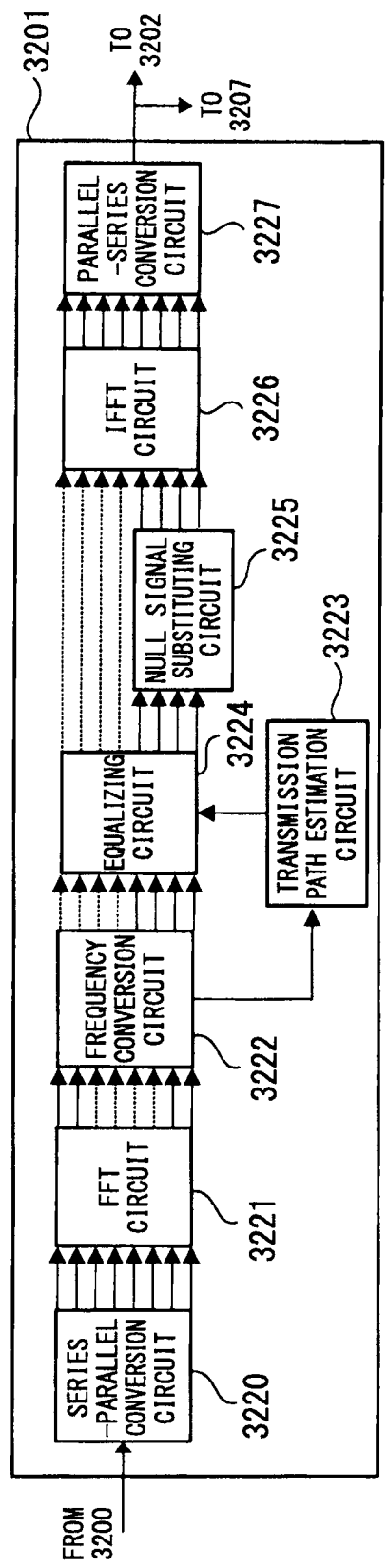
FIG. 14A is a block diagram that shows a reception filter bank 3201 shown in FIG. 14.
Figure 14B:
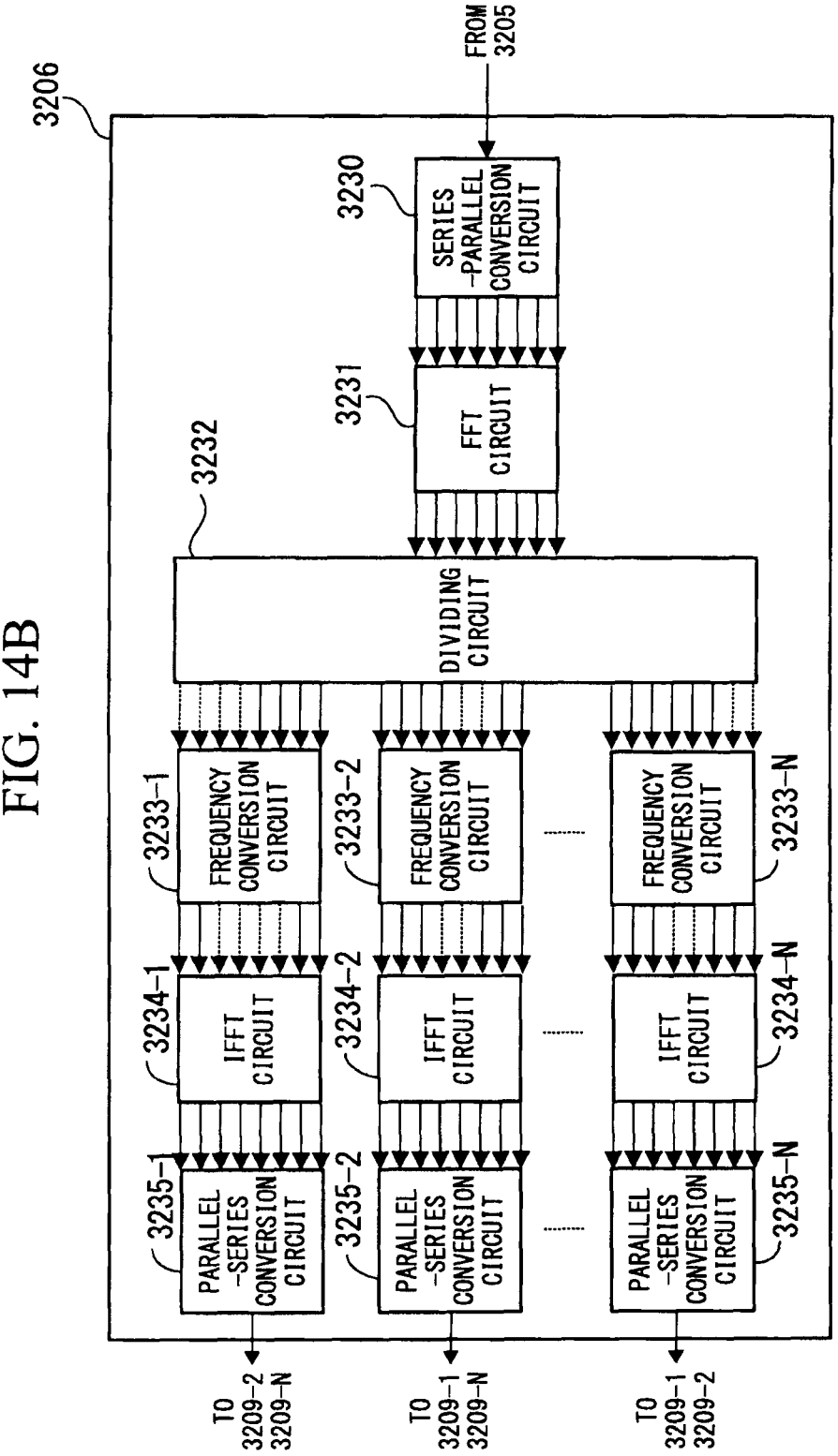
FIG. 14B is a block diagram that shows a sub-spectrum replica generating filter bank 3206 shown in FIG. 14.

As shown in FIG. 14A, the reception filter bank 3201 is provided with a second series-parallel conversion circuit 3220, a second FFT circuit 3221, a second frequency conversion circuit 3222, a transmission path estimation circuit 3223, an equalizing circuit 3224, a null signal substituting circuit 3225, a second IFFT circuit 3226, and a second parallel-series conversion circuit 3227. As shown in FIG. 14B, the sub-spectrum replica generating filter bank 3206 is provided with a third series-parallel conversion circuit 3230, a third FFT circuit 3231, a second dividing circuit 3232, third frequency conversion circuits 3233-1 to 3233-N, third IFFT circuits 3234-1 to 3234-N, and second parallel-series conversion circuits 3235-1 to 3235-N.

Figure 14C:
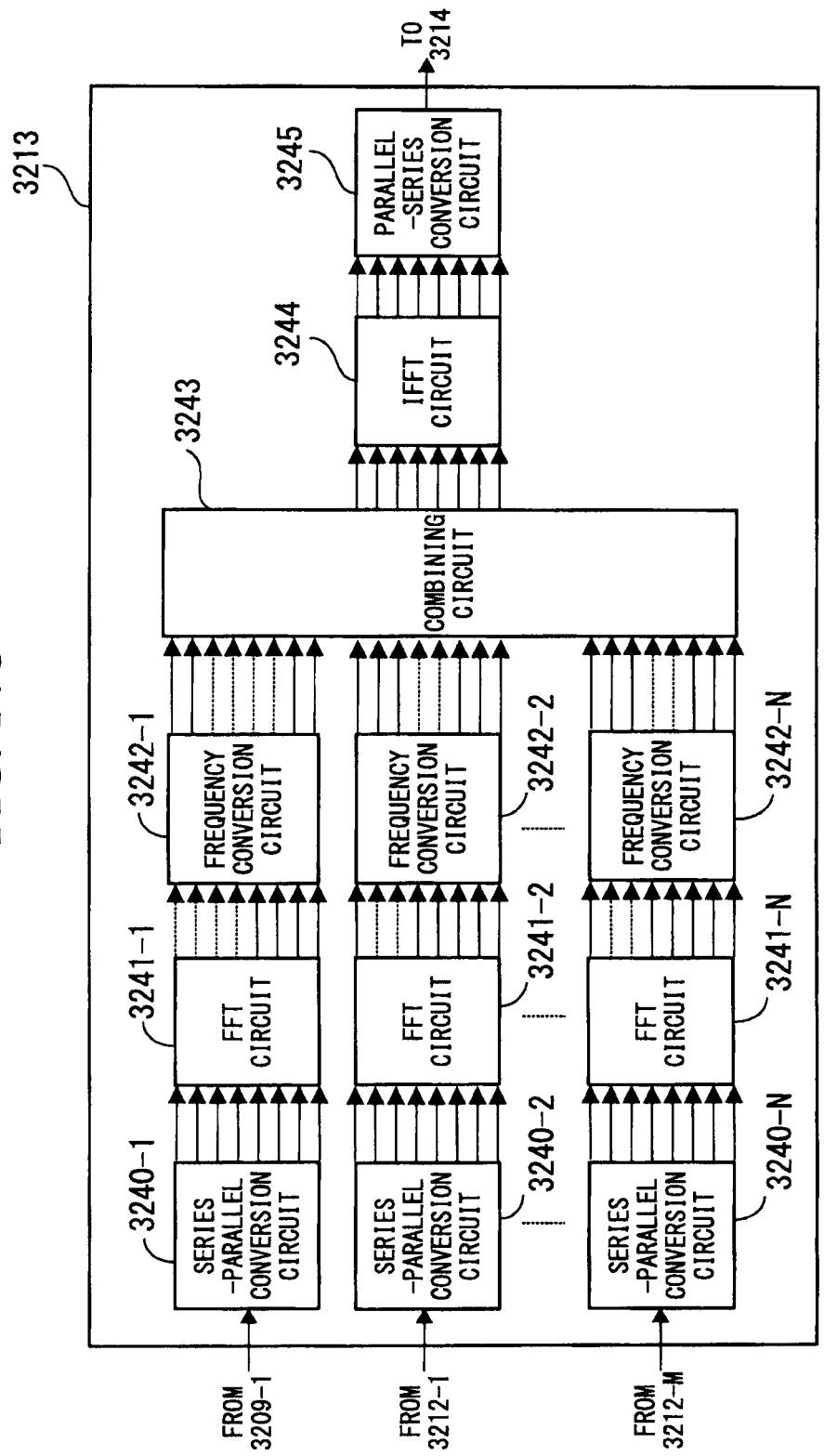
FIG. 14C is a block diagram that shows a combining filter bank 3213 shown in FIG. 14.

As shown in FIG. 14C, the combining filter bank 3213 is provided with fourth series-parallel conversion circuits 3240-1 to 3240-N, fourth FFT circuits 3241-1 to 3241-N, fourth frequency conversion circuits 3242-1 to 3242-N, a second combining circuit 3243, a fourth IFFT circuit 3244, and a fourth parallel-series conversion circuit 3245.

Next, the operation of the receiving device 200d shall be described.

Figure 15A:
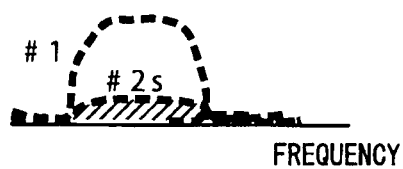
FIG. 15A is a waveform chart that shows the processing of the receiving device according to the fourth embodiment.
Figure 15B:
FIG. 15B is a waveform chart that shows the processing of the receiving device according to the fourth embodiment.

FIGS. 15A to 15H are conceptual diagrams showing the signal used in the receiving device 200d according to the fourth embodiment. First, for a received signal, the receiving device 200d considers that only the sub-spectrum having the greatest occupied bandwidth has been transmitted, and performs temporary demodulation and decoding. The A/D conversion circuit 3200 converts the signal that has been received by the antenna of the receiving device 200d (not illustrated) (received signal) into a digital signal. The A/D converter 3200 outputs the received signal after conversion to the reception filter bank 3201 (FIG. 15A).

In the reception filter bank 3201, the second series-parallel conversion circuit 3220 carries out series-parallel conversion of the received signal. The second FFT circuit 3221 performs a fast Fourier transform on the received signals that have undergone series-parallel conversion, and converts the received signals from signals of the time domain to signals of frequency domain (FIG. 15A). The second frequency conversion circuit 3222 returns the central frequency of the sub-spectrum having the greatest occupied bandwidth to the frequency position prior to sub-spectrum division. The transmission path estimation circuit 3223 estimates the transmission path coefficient using known signals, such as a training signal, a reference signal, and a sounding signal.

The equalizing circuit 3224 compensates the amplitude phase distortion of the received signals by frequency-domain equalization processing using the transmission path coefficient estimated in the transmission path estimation circuit 3223. The Zero Forcing method and the like are known examples of frequency domain equalization processing.

The null signal substituting circuit 3225 substitutes the frequency components other than the sub-spectrum having the greatest frequency bandwidth with a 0 signal. In the transmitting device 100c, since other sub-spectrum were superimposed on the sub-spectrum having the greatest frequency bandwidth, there is the risk of interference signals from other users and other systems and noise signals produced by RF devices not shown in the present constitution (LNA: Low Noise Amplifiers and the like) being mixed in the frequency bands other than the sub-spectrum having the greatest occupied bandwidth. However, by substituting those frequency bands with a 0 signal as described above, it is possible to remove these noise and interference components.

The second IFFT circuit 3226 performs a fast inverse Fourier transfer, to convert the received signals of which some frequency components have been replaced with 0 signals from signals of the frequency domain to signals of the time domain. The second parallel-series conversion circuit 3227 performs parallel-series conversion of the signals of the time domain that have been output from the second IFFT circuit 3226, to produce the output o the reception filter bank 3201.

The output of the reception filter bank 3201 is passed to the receiving buffer circuit 3207 and the first demodulation circuit 3202, and the first demodulation circuit 3202 and the first decoding circuit 3203 perform temporary demodulation and decoding of the time-domain signal.

Figure 15C:
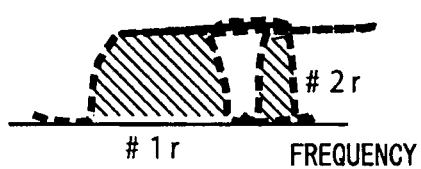
FIG. 15C is a waveform chart that shows the processing of the receiving device according to the fourth embodiment.
Figure 15D:
FIG. 15D is a waveform chart that shows the processing of the receiving device according to the fourth embodiment.

Next, the receiving device 200d generates a replica of the transmitted signal from the data obtained by demodulating and decoding. The re-encoding circuit 3204 and the re-modulation circuit 3205 generate a plurality of modulation symbols by performing re-encoding process and re-modulation process (mapping process) on the data that was acquired by temporary demodulation and decoding (FIG. 15D). In the case of using a soft decision value (likelihood) as a temporary demodulation decoding value, it is also possible to directly generate a soft decision replica signal without passing through the re-encoding process. The transmission replica signal that is generated in this way is delivered to the sub-spectrum replica generating filter bank 3206.

The sub-spectrum replica generating filter bank 3206 has the same constitution as the transmission filter bank 3102 in the transmitting device 100c. The third series-parallel conversion circuit 3230 carries out series-parallel conversion of the signal. The third FFT circuit 3231 performs a fast Fourier transform on the re-modulated signals that underwent series-parallel conversion, to convert the re-modulated signals from signals of the time domain to signals of the frequency domain. The second dividing circuit 3232 multiplies the replica signals of the frequency domain that were outputted by the third FFT circuit 3231 by filter coefficients that correspond to the filter coefficients that were used for generating the N sub-spectra in the first dividing circuit 3108 of the transmitting device 100c, to thereby generate N transmission sub-spectrum replicas (FIG. 15C).

The third frequency conversion circuits 3233-1 to 3233-N perform frequency conversion on each of the sub-spectrum replicas to be the same as the corresponding sub-spectrum by the frequency conversion circuits 3109-1 to 3109-N of the transmitting device 100c. The third IFFT circuits 3234-1 to 3234-N perform a fast inverse Fourier transform to convert the N channel output signals of the third frequency conversion circuits 3233-1 to 3233-N from signals of the frequency domain to signals of the time domain. The second parallel-series conversion circuits 3235-1 to 3235-N carry out parallel-series conversion of the signals of the time-domain outputted from the third IFFT circuits 3234-1 to 3234-N, to produce the output of the sub-spectrum replica generating filter bank 3206.

The second spreading sequence multiplication circuits 3208-1 to 3208-M (M=N−1) multiply the same spreading code as the spreading code that was applied in the first spreading sequence multiplication circuits 3103-1 to 3103-M in the transmitting device 100c to each sub-spectrum corresponding by the N−1 transmitted sub-spectrum replicas other than the sub-spectrum replica corresponding to the sub-spectrum having the greatest bandwidth. Thereby, the N−1 sub-spectrum replicas are spread in the same way as the transmitted sub-spectra.

The receiving buffer circuit 3207 holds the output of the reception filter bank 3201, and plays the role of a delay device that absorbs the processing delay time from the first demodulation circuit 3202 to the second spreading sequence multiplication circuits 3208-1 to 3208-M.

The subtracting circuits 3209-1 to 3209-N are respectively provided in the N channels, and from the received signal that is stored in the receiving buffer circuit 3207 select and subtract respectively differing N−1 signals among the spread signals of aforementioned one sub-spectrum replica (the sub-spectrum replica that has the greatest occupied bandwidth) and the N−1 sub-spectrum replicas.

Figure 15E:
FIG. 15E is a waveform chart that shows the processing of the receiving device according to the fourth embodiment.

Specifically, when all of the N−1 sub-spectrum replica spread signals have been subtracted from the received signal that has been buffered, the received signal of the sub-spectrum having the greatest occupied bandwidth is extracted. Meanwhile, when the sub-spectrum replica having the greatest occupied bandwidth and the N−2 sub-spectrum replica spread signal group are subtracted from the received signal that has been buffered, the spread signal of the sub-spectrum corresponding to the spread sequence that was not selected in the sub-spectrum replica spread signal group is extracted (FIG. 15E, FIG. 15G).

Accordingly, the spread signals of the sub-spectrum having the greatest occupied bandwidth and the N−1 sub-spectra other than that are extracted from the N channel subtracting circuits 3209-1 to 3209-N. Note that FIG. 15E shows the result of subtracting the sub-spectrum replica #1r (FIG. 15C) from the received signal (FIG. 15A), while FIG. 15G shows the result of subtracting the spread signal of the sub-spectrum replica #2r from the received signal (FIG. 15A).

Figure 15F:
FIG. 15F is a waveform chart that shows the processing of the receiving device according to the fourth embodiment.
Figure 15G:
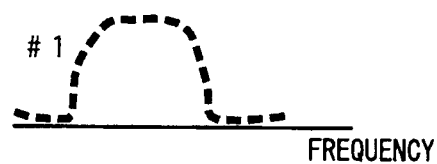
FIG. 15G is a waveform chart that shows the processing of the receiving device according to the fourth embodiment.

The third spreading sequence multiplication circuits 3212-1 to 3212-M (M=N−1) are applied to the outputs of the subtracting circuits 3209-1 to 3209-N accompanying the output of other than the sub-spectrum having the greatest occupied bandwidth, among the aforementioned subtracting circuits 3209-1 to 3209-N, and perform a reverse spreading process of the sub-spectra that have been spread (FIG. 15F).

In the combining filter bank 3213, the fourth series-parallel conversion circuits 3240-1 to 3240-N respectively perform series-parallel conversion of the sub-spectrum having the greatest occupied bandwidth that is one of the outputs of the subtractor 3209 and the sub-spectra that are obtained by reverse spreading the remaining N−1 spread signals with the aforementioned third spreading sequence multiplication circuits 3212-1 to 3212-M. The fourth FFT circuits 3241-1 to 3241-N perform a fast Fourier transform on the received signals that have undergone series-parallel conversion, and convert each output of the fourth series-parallel conversion circuits 3240-1 to 3240-N from a signal of the time domain to a signal of the frequency domain.

Figure 15H:
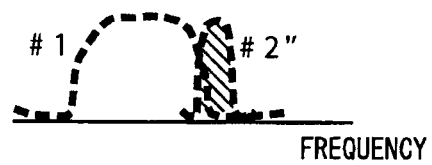
FIG. 15H is a waveform chart that shows the processing of the receiving device according to the fourth embodiment.

The fourth frequency conversion circuits 3242-1 to 3242-N perform frequency conversion so that the central frequencies of the frequency signals obtained by the fourth FFT circuits 3241-1 to 3241-N become the same as the central frequencies of the sub-spectra that are generated by the dividing circuit 108 in the transmitting device 100c. The fourth combining circuit 3243 adds and combines each signal that was frequency converted by the aforementioned fourth frequency conversion circuits 3242-1 to 3242-N (FIG. 15H). The fourth IFFT circuit 3244 performs a fast inverse Fourier transform to convert the signals from signals of the frequency domain to signals of the time domain. The fourth parallel-series conversion circuit 3245 performs parallel-series conversion of the signals of the time domain that have been output from the second IFFT circuit 3244, and produces the output of the combining filter bank 3213.

The second demodulation circuit 3214 and the second decoding circuit 3215 respectively demodulate and decode the time-domain signal.

In the receiving device 200d that is constituted in this manner, among the sub-spectra that are superimposed by the processing in the second series-parallel conversion circuit 3220 to the second parallel-series conversion circuit 3227, the sub-spectra other than the sub-spectrum having the greatest occupied bandwidth are treated as a noise component, and temporarily demodulated and decoded. By re-modulating using the signal obtained by temporary demodulation, and performing processing in the third series-parallel conversion circuit 3230 to the second spreading sequence multiplication circuits 3208-1 to 3208-M, replicas of the (spread) sub-spectra are generated.

By performing subtraction of the sub-spectra N−1 multiplied by the transmission path coefficient from the received signal for a combination of the sub-spectra, each sub-spectrum or the spread signal thereof is extracted from the received signal. For the sub-spectra that have been spread at the transmitting device 100c side, by performing reverse spreading of the spread signal of each sub-spectrum that has been extracted to return it to its original frequency and then combining, it is possible to regenerate and demodulate the spectra of the transmitted signal. Thereby, it is possible to divide the sub-spectra that have been superimposed in the transmitting device 100c.

Note that in the aforementioned receiving device according to the aforementioned fourth embodiment, by re-inputting the decoding result of the second decoding circuit 3215 to the re-encoding circuit 3204, and repeating the processing from the re-encoding circuit 3204 to the second decoding circuit 3215, the residual interference is reduced, and it is possible to improve the division accuracy, that is, the reception characteristic.

According to the receiving device of the fourth embodiment, since transmission is performed with the transmitting device 100c by generating N sub-spectra that divide a spectrum, spreading those other than the sub-spectrum with the widest band to have the same bandwidth as that sub-spectrum, and superimposing them on the same frequency by frequency conversion, the frequency bandwidths that are superimposed between the occupied bandwidth, so it is possible to improve the frequency utilization efficiency without losing the signal component itself.

Also, in the receiving device 200d, by generating replicas of the sub-spectra from the received signal and removing them from the received signal in order the divide the superimposed sub-spectra. Thereby, each sub-spectrum is regenerated while being compensated, and by returning them to their original frequencies and combining, it is possible to restore the transmission signal with no superimposed components.

Hereinabove, embodiments of the present invention were described in detail with reference to the drawings, but specific constitutions are not limited to these embodiments, and designs within a scope that does not depart from the gist of this invention are also included.

DESCRIPTION OF THE REFERENCE SYMBOLS 10 communication system
100 transmitting device
200 receiving device
101 error correction encoding circuit
102 modulation circuit
103 transmission filter bank
104 D/A converter
105 control circuit
201 A/D conversion circuit
202 first series-parallel conversion circuit
203 first FFT circuit
204 extraction circuit
205 distortion compensation circuit
206 first IFFT circuit
207 first parallel-series conversion circuit
208 first demodulation circuit
209 first error correcting decoding circuit
210 transmission signal replica generating circuit
211 second series-parallel conversion circuit
212 second FFT circuit
213 dividing circuit
214 receiving buffer
215 combining circuit
216 second IFFT circuit
217 second parallel-series conversion circuit
218 second demodulation circuit
219 second error correction decoding circuit
220 hard decision circuit 220
230 feedback block
100b transmitting device
200c receiving device
2100 first encoding circuit
2101 first modulation circuit
2102 transmission filter bank
2103 D/A converter
2200 A/D conversion circuit
2201 reception filter bank
2202 first demodulation circuit
2203 first decoding circuit
2204 re-encoding circuit
2205 re-modulation circuit
2206 sub-spectrum replica generating filter bank
2207 receiving buffer circuit
2209-1 to 2209-N subtracting circuits
2213 combining filter bank
2214 second demodulation circuit
2215 second decoding circuit
100c transmitting device
200d receiving device
3100 first encoding circuit
3101 first modulation circuit
3102 transmission filter bank
3103-1 to 3103-M first spreading sequence multiplication circuits
3104 first combining circuit
3105 D/A converter
3200 A/D conversion circuit
3201 reception filter bank
3202 first demodulation circuit
3203 first decoding circuit
3204 re-encoding circuit
3205 re-modulation circuit
3206 sub-spectrum replica generating filter bank
3207 receiving buffer circuit
3208-1 to 3208-M second spreading sequence multiplication circuits
3209-1 to 3209-N subtracting circuits
3212-1 to 3212-M third spreading sequence multiplication circuits
3213 combining filter bank
3214 second demodulation circuit
3215 second decoding circuit

The invention claimed is:

1. A receiving device comprising:
a means that receives, as a received signal, a signal that has been transmitted by dividing by N the spectrum of a signal to be transmitted and performing spectrum editing to reduce its occupied bands;
a means that generates a first decoded signal by error-correcting and decoding the received signal in the bandwidth of the signal to be transmitted;
a means that generates a transmission replica signal from the first decoded signal and divides by N the spectrum of the transmission replica signal to generate N sub-replicas;
a means that generates a compensated received signal by restoring the spectrum of the signal to be transmitted using the N sub-replicas and the received signal; and
a means that decodes the compensated received signal to generate a second decoded signal.

2. A receiving device that receives a signal that has been transmitted by components of bands of the transmission object signal being removed by a transmitting device, the receiving device comprising:
a first parallel-series conversion circuit that carries out series-parallel conversion of a signal that has been received;
a first FFT circuit that performs a Fourier transform on the signal that has undergone series-parallel conversion;
an extraction circuit that extracts a signal component in each predetermined frequency band from the signal that undergone a Fourier transform;
a distortion compensation circuit that performs distortion compensation using predetermined signal components, on signal components of the bands that have been removed by the transmitting device, among the plurality of signal components;
a first IFFT circuit that performs an inverse Fourier transform on the signal that has been distortion compensated;
a first parallel-series conversion circuit that carries out parallel-series conversion of the signal that has been subjected to the inverse Fourier transform;

a first demodulation circuit that demodulates the signal that has undergone parallel-series conversion;
a first error correction decoding circuit that performs error correction decoding on the signal that has been demodulated;
a transmission signal replica generating circuit that generates a replica of the transmission object signal from the signal on which the error correction decoding was performed;
a second parallel-series conversion circuit that carries out parallel-series conversion of the transmission signal replica;
a second FFT circuit that performs a Fourier transform on the transmission signal replica that has undergone series-parallel conversion;
a dividing circuit that extracts the signal components of the bands that were removed by the transmitting device from the transmission signal replica that has been subjected to the Fourier transform;
a receiving buffer that stores the received signal;
a combining circuit that combines the signal that has been stored in the receiving buffer and the signal components that have been extracted by the dividing circuit and outputs a combined signal;
a second demodulation circuit that demodulates the combined signal; and
a second error correction decoding circuit that performs error correction decoding on the combined signal that has been demodulated.

3. The receiving device according to claim 2, wherein the distortion compensation circuit performs the distortion compensation by attenuating the signal components of the bands that have been removed by the transmitting device, while leaving the signal components of the other bands that have not been removed by the transmitting device as they are.

4. A receiving device that performs wireless communication with a transmitting device, comprising:
a reception filter circuit that divides a received signal into N (N being an integer of 2 or more) sub-spectra, frequency-converts the received signal that has been divided to return it to the frequency prior to being frequency-converted in the transmitting device, and combines the receives signal that has been divided and frequency converted;
a first demodulation circuit that demodulates the received signal from the reception filter circuit to generate a tentative demodulated signal;
a re-modulation circuit that modulates the tentative demodulated signal from the first demodulation circuit to generate a re-modulated signal;
a sub-spectrum replica generating filter circuit that divides the re-modulated signal generated by the re-modulation circuit into N divided sub-spectrum replicas, converts each of the N sub-spectrum replicas to the same frequency as the frequency conversion in the transmitting device and outputs them;
subtracting circuits that extract N post-compensation sub-received signals by subtracting from the received signal respective combinations of N−1 sub-spectrum replicas among the sub-spectrum replicas divided into N that were converted by the sub-spectrum replica generating filter circuit;
a combining filter circuit that converts the N post-compensation sub-received signals that were extracted by the subtracting circuits to the frequency of each modulated signal prior to frequency conversion at the transmitting device side, and combines the N post-compensation sub-received signals that have been frequency converted to generate a post-compensation received signal; and
a second demodulation circuit that demodulates the post-compensation received signal combined by the combining filter circuit.

5. A wireless communication system that is constituted by a transmitting device and a receiving device, wherein
the transmitting device comprises:
an encoding circuit that encodes transmission data;
a modulation circuit that modulates the encoded data that was encoded by the encoding circuit; and
a transmission filter circuit that converts the modulated signal that was modulated by the modulation circuit into N divided sub-spectra (N being an integer of 2 or more), frequency converts the divided N modulated signals to superimpose part of the sub-spectra, and combines and outputs the N modulated signals on which the part of the sub-spectra has been superimposed;
and the receiving device comprises:
a reception filter circuit that divides the received signal into N sub-spectra, frequency-converts the received signal that has been divided to return it to the frequency prior to being frequency-converted in the transmitting device, and combines the received signal that has been divided and frequency converted;
a first demodulation circuit that demodulates the received signal from the reception filter circuit to generate a tentative demodulated signal;
a re-modulation circuit that modulates the tentative demodulated signal from the first demodulation circuit to generate a re-modulated signal;
a sub-spectrum replica generating filter circuit that divides the re-modulated signal generated by the re-modulation circuit into N divided sub-spectrum replicas, converts each of the N sub-spectrum replicas to the same frequency as the frequency conversion in the transmitting device and outputs them;
subtracting circuits that extract N post-compensation sub-received signals by subtracting from the received signal respective combinations of N−1 sub-spectrum replicas among the sub-spectrum replicas divided into N that were converted by the sub-spectrum replica generating filter circuit;
a combining filter circuit that converts the N post-compensation sub-received signals that were extracted by the subtracting circuits to the frequency of each modulated signal prior to frequency conversion at the transmitting device side, and combines the N post-compensation sub-received signals that have been frequency converted to generate a post-compensation received signal; and
a second demodulation circuit that demodulates the post-compensation received signal combined by the combining filter circuit.

6. The wireless communication system according to claim 5, wherein the transmission filter circuit comprises:
a first FFT circuit that performs a Fourier transform on the modulated signal that has been modulated by the modulation circuit;
a first dividing circuit that divides the modulated signal that underwent a Fourier transform by the first FFT circuit into N sub-spectra;
first frequency conversion circuits that frequency-convert the N sub-spectra that have been divided by the first dividing circuit to superimpose the part of the sub-spectra;

a first combining circuit that combines the N sub-spectra that have been frequency-converted by the first frequency conversion circuits; and a first IFFT circuit that carries out an inverse Fourier transform on the sub-spectra that have been combined by the first combining circuit to generate a transmission signal.

7. The wireless communication system according to claim 5, wherein the reception filter circuit comprises:

a second FFT circuit that performs a Fourier transform on the received signal;

a second dividing circuit that divides the received signal that has undergone a Fourier transform by the second FFT circuit into N sub-spectra;

second frequency conversion circuits that frequency-convert the N sub-spectra that have been divided by the second dividing circuit to return them to their frequencies prior to being frequency-converted at the transmitting device;

a second combining circuit that combines the N sub-spectra that have been frequency-converted by the second frequency conversion circuits; and a second IFFT circuit that carries out an inverse Fourier transform on the received signal that has been combined by the second combining circuit.

8. The wireless communication system according to claim 5, wherein the sub-spectrum replica generating filter circuit comprises:

a third FFT circuit that performs a Fourier transform on the re-modulated signal that has been generated by the re-modulation circuit;

a second dividing circuit that divides the re-modulated signal that has undergone a Fourier transform by the third FFT circuit into N sub-spectrum replicas of the same frequency bands as the part of the sub-spectra that has been superimposed by the transmitting device;

third frequency conversion circuits that convert each of the N sub-spectrum replicas that have been divided by the second dividing circuit to the same frequency as the frequency conversion in the transmitting device; and a third IFFT circuit that carries out and outputs an inverse Fourier transform on the N sub-spectrum replicas that have been converted to the same frequency by the third frequency conversion circuits.

9. The wireless communication system according to claim 5, wherein the combining filter circuit comprises:

fourth frequency conversion circuits that convert the N post-compensation sub-received signals that have extracted by the subtracting circuit to the frequency of each modulated signal prior to frequency conversion at the transmitting device side;

a third combining circuit that combines the N post-compensation sub-received signals that have been frequency converted by the fourth frequency conversion circuits to generate a post-compensation received signal; and a third IFFT circuit that carries out an inverse Fourier transform on the post-compensation received signal that was combined by the third combining circuit.

10. A transmitting device that performs wireless communication with a receiving device comprising:

an encoding circuit that encodes transmission data;

a modulation circuit that modulates the encoded data that was encoded by the encoding circuit; and a transmission filter circuit that converts the modulated signal that was modulated by the modulation circuit into N divided sub-spectra (N being an integer of 2 or more), frequency converts the divided N modulated signals to superimpose part of the sub-spectra, and combines and outputs the N modulated signals on which the part of the sub-spectra has been superimposed.

11. A receiving device that performs wireless communication with a transmitting device comprising:

a reception filter circuit that, with respect to the received signal, inserts a "0" into the frequency bands other than the frequency band of the sub-spectrum with the greatest frequency bandwidth among sub-spectra that are frequency bands of modulated signal and that have been divided by N (N being an integer of 2 or more), and outputs the received signal in which "0" has been inserted;

a first demodulation circuit that demodulates the received signal from the reception filter circuit to output a tentative demodulated signal;

a re-modulation circuit that modulates the tentative demodulated signal from the first demodulation circuit to generate a re-modulated signal;

a sub-spectrum replica generating filter circuit that converts the re-modulated signal that has been generated by the re-modulation circuit into N-divided sub-re-modulated signals and outputs them;

a second spreading circuit that, among the sub-re-modulated signals divided by N by the sub-spectrum replica generating filter circuit, spreads those other than the sub-re-modulated signal with the greatest frequency bandwidth to the same bandwidth as the sub-re-modulated signal with the greatest frequency bandwidth;

subtracting circuits that extract N post-compensation sub-received signals by subtracting from the received signal respective combinations of N−1 sub-re-modulated signals;

a reverse spreading processing circuit that, among the N post-compensation sub-received signals extracted by the subtracting circuits, carries out reverse spreading processing on those that underwent spreading processing at the transmitting device side;

a combining filter circuit that converts the N post-compensation sub-received signals that were reverse spreading processed by the reverse spreading processing circuit to the frequency of each modulated signal prior to frequency conversion at the transmitting device side, and combines the N post-compensation sub-received signals that have been frequency converted to generate a post-compensation received signal; and a second demodulation circuit that demodulates the post-compensation received signal that was combined by the combining filter circuit.

12. A wireless communication system that is constituted by a transmitting device and a receiving device, wherein the transmitting device comprises:

an encoding circuit that encodes transmission data;

a modulation circuit that modulates the encoded data that was encoded by the encoding circuit;

a transmission filter circuit that converts the modulated signal that was modulated by the modulation circuit into sub-spectra divided into N (N being an integer of 2 or more) and outputs them;

a first spreading circuit that, among the sub-spectra divided into N by the transmission filter circuit, spreads N−1 sub-spectra other than the sub-spectrum with the greatest frequency bandwidth in a range equal to or less than the bandwidth of the sub-spectrum with the greatest frequency bandwidth; and a first combining circuit that combines the sub-spectrum with the greatest frequency bandwidth and the N−1 sub-spectra that have been spread by the first spreading circuit to generate a transmission signal;

and the receiving device comprises:

a reception filter circuit that, in the received signal, inserts a "0" into the frequency bands other than the frequency band of the sub-spectrum with the greatest frequency bandwidth among sub-spectra that are frequency bands of the modulated signal and that have been divided by N (N being an integer of 2 or more), and outputs the received signal in which "0" has been inserted;

a first demodulation circuit that demodulates the received signal from the reception filter circuit to generate a temporarily demodulated signal;

a re-modulation circuit that modulates the temporarily demodulated signal from the first demodulation circuit to generate a re-modulated signal;

a sub-spectrum replica generating filter circuit that converts the re-modulated signal that has been generated by the re-modulation circuit into N-divided sub-re-modulated signals and outputs them;

a second spreading circuit that, among the sub-re-modulated signals divided by N by the sub-spectrum replica generating filter circuit, spreads those other than the sub-re-modulated signal with the greatest frequency bandwidth to the same bandwidth as the sub-re-modulated signal with the greatest frequency bandwidth;

subtracting circuits that extract N post-compensation sub-received signals by subtracting from the received signal respective combinations of N−1 sub-re-modulated signals;

a reverse spreading processing circuit that, among the N post-compensation sub-received signals extracted by the subtracting circuits, carries out reverse spreading processing on those that underwent spreading processing at the transmitting device side;

a combining filter circuit that converts the N post-compensation sub-received signals that were reverse spreading processed by the reverse spreading processing circuit to the frequency of each modulated signal prior to frequency conversion at the transmitting device side, and combines the N post-compensation sub-received signals that have been frequency converted to generate a post-compensation received signal; and a second demodulation circuit that demodulates the post-compensation received signal that was combined by the combining filter circuit.

13. The wireless communication system according to claim 12, wherein the transmission filter circuit comprises:

a first FFT circuit that performs a Fourier transform on the modulated signal that was modulated by the modulation circuit;

a first dividing circuit that divides the modulated signal that underwent a Fourier transform by the first FFT circuit into N sub-spectra;

first frequency conversion circuits that convert the N sub-spectra that were divided by the first dividing circuit to the same frequency as the sub-spectrum with the greatest frequency bandwidth; and a first IFFT circuit that carries out an inverse Fourier transform on the N sub-spectra that were converted to the same frequency by the first frequency conversion circuits and outputs them.

14. The wireless communication system according to claim 13, wherein the reception filter circuit comprises:

a second FFT circuit that performs a Fourier transform on the received signal;

a null inserting circuit that, in the received signal that has been subjected to a Fourier transform, inserts a "0" into the frequency bands other than the frequency band of the sub-spectrum with the greatest frequency bandwidth among sub-spectra that have been divided by the first dividing circuit; and a second IFFT circuit that performs an inverse Fourier transform on the received signal in which the "0" has been inserted.

15. The wireless communication system according to claim 12, wherein the sub-spectrum replica generating filter circuit comprises:

a third FFT circuit that performs a Fourier transform on the re-modulated signal that has been generated by the re-modulation circuit;

a second dividing circuit that divides the re-modulated signal that has undergone a Fourier transform by the third FFT circuit into N sub-re-modulated signals of the same frequency bands as the frequency conversion in the transmitting device;

third frequency conversion circuits that convert each of the N sub-re-modulated signals that have been divided by the second dividing circuit to the same frequency as the frequency conversion in the transmitting device; and a third IFFT circuit that carries out and outputs an inverse Fourier transform on the N sub-re-modulated signals that have been converted to the same frequency by the third frequency conversion circuits.

16. The wireless communication system according to claim 12, wherein the combining filter circuit comprises:

third frequency conversion circuits that convert the post-compensation sub-received signals that have undergone a reverse spreading process by the reverse spreading processing circuit to the frequency of each modulated signal prior to frequency conversion at the transmitting device side; and a second combining circuit that combines the N post-compensation sub-received signals that have been frequency converted by the third frequency conversion circuits to generate a post-compensation received signal.

17. A transmitting device that performs wireless communication with a receiving device, wherein the transmitting device comprises:

an encoding circuit that encodes transmission data;

a modulation circuit that modulates the encoded data that was encoded by the encoding circuit;

a transmission filter circuit that converts the modulated signal that was modulated by the modulation circuit into sub-spectra divided into N (N being an integer of 2 or more) and outputs them;

a first spreading circuit that, among the sub-spectra divided into N by the transmission filter circuit, spreads N−1 sub-spectra other than the sub-spectrum with the greatest frequency bandwidth in a range equal to or less than the bandwidth of the sub-spectrum with the greatest frequency bandwidth; and a first combining circuit that combines the sub-spectrum with the greatest frequency bandwidth and the N−1 sub-spectra that have been spread by the first spreading circuit to generate a transmission signal.

18. A receiving method comprising:

a step that receives, as a received signal, a signal that has been transmitted by dividing by N the spectrum of a signal to be transmitted and performing spectrum editing to reduce its occupied bands;

a step that generates a first decoded signal by error-correcting and decoding the received signal in the bandwidth of the signal to be transmitted;

a step that generates a transmission replica signal from the first decoded signal and divides by N the spectrum of the transmission replica signal to generate N sub-replicas;

a step that generates a compensated received signal by restoring the spectrum of the signal to be transmitted using the N sub-replicas and the received signal; and a step that decodes the compensated received signal to generate a second decoded signal.

19. A receiving method that receives a signal that has been transmitted by components of bands of the transmission object signal being removed by a transmitting device, the receiving method comprising:

a first parallel-series conversion step that carries out series-parallel conversion of a signal that has been received;

a first FFT step that performs a Fourier transform on the signal that has undergone series-parallel conversion;

an extraction step that extracts a signal component in each predetermined frequency band from the signal that undergone a Fourier transform;

a distortion compensation step that performs distortion compensation using predetermined signal components, on signal components of the bands that have been removed by the transmitting device, among the plurality of signal components;

a first IFFT step that performs an inverse Fourier transform on the signal that has been distortion compensated;

a first parallel-series conversion step that carries out parallel-series conversion of the signal that has been subjected to the inverse Fourier transform;

a first demodulating step that demodulates the signal that has undergone parallel-series conversion;

a first error correction decoding step that performs error correction decoding on the signal that has been demodulated;

a transmission signal replica generating step that generates a replica of the transmission object signal from the signal on which the error correction decoding was performed;

a second parallel-series conversion step that carries out parallel-series conversion of the transmission signal replica;

a second FFT step that performs a Fourier transform on the transmission signal replica that has undergone series-parallel conversion;

a dividing step that extracts the signal components of the bands that were removed by the transmitting device from the transmission signal replica that has been subjected to the Fourier transform;

a receiving buffer step that stores the received signal;

a combining step that combines the signal that has been stored in the receiving buffer and the signal components that have been extracted by the dividing circuit and outputs a combined signal;

a second demodulating step that demodulates the combined signal; and a second error correction decoding step that performs error correction decoding on the combined signal that has been demodulated.

20. The receiving method device according to claim 19, wherein the distortion compensation step performs the distortion compensation by attenuating the signal components of the bands that have been removed by the transmitting device, while leaving the signal components of the other bands that have not been removed by the transmitting device as they are.

21. A receiving method for performing wireless communication with a transmitting device, comprising:

a receiving filtering step that divides a received signal into N (N being an integer of 2 or more) sub-spectra, frequency-converts the received signal that has been divided to return it to the frequency prior to being frequency-converted in the transmitting device, and combines the receives signal that has been divided and frequency converted;

a first demodulating step that demodulates the received signal from the receiving filtering step to generate a tentative demodulated signal;

a re-modulating step that modulates the tentative demodulated signal from the first demodulating step to generate a re-modulated signal;

a sub-spectrum replica generating step that divides the re-modulated signal generated by the re-modulating step into N divided sub-spectrum replicas, converts each of the N sub-spectrum replicas to the same frequency as the frequency conversion in the transmitting device and outputs them;

subtraction step that extracts N post-compensation sub-received signals by subtracting from the received signal respective combinations of N−1 sub-spectrum replicas among the sub-spectrum replicas divided into N that were converted by the sub-spectrum replica generating step;

a combining filtering step that converts the N post-compensation sub-received signals that were extracted by the subtraction step to the frequency of each modulated signal prior to frequency conversion at the transmitting device side, and combines the N post-compensation sub-received signals that have been frequency converted to generate a post-compensation received signal; and a second demodulating step that demodulates the post-compensation received signal combined by the combining filtering step.

22. A wireless communication method that is performed by a transmitting device and a receiving device, wherein the transmitting device comprises:

an encoding step that encodes transmission data;

a modulating step that modulates the encoded data that was encoded; and a transmitting filtering step that converts the modulated signal that was modulated into N divided sub-spectra (N being an integer of 2 or more), frequency converts the divided N modulated signals to superimpose part of the sub-spectra, and combines and outputs the N modulated signals on which the part of the sub-spectra has been superimposed;

and the receiving device comprises:

a receiving filtering step that divides the received signal into N sub-spectra, frequency-converts the received signal that has been divided to return it to the frequency prior to being frequency-converted in the transmitting device, and combines the received signal that has been divided and frequency converted;

a first demodulating step that demodulates the received signal that has been combined to generate a tentative demodulated signal;

a re-modulating step that modulates the tentative demodulated signal to generate a re-modulated signal;

a sub-spectrum replica generating step that divides the re-modulated signal that has been generated into N divided sub-spectrum replicas, converts each of the N sub-spectrum replicas to the same frequency as the frequency conversion in the transmitting device and outputs them;

a subtraction step that extracts N post-compensation sub-received signals by subtracting from the received signal respective combinations of N−1 sub-spectrum replicas among the sub-spectrum replicas divided into N that were converted;

a combining filtering step that converts the N post-compensation sub-received signals that were extracted to the frequency of each modulated signal prior to frequency conversion at the transmitting device side, and combines the N post-compensation sub-received signals that have been frequency converted to generate a post-compensation received signal; and a second demodulating step that demodulates the post-compensation received signal that was combined.

23. The wireless communication method according to claim 22, wherein the transmitting filtering step comprises:

a first Fourier transform step that performs a Fourier transform on the modulated signal that was modulated by the modulation circuit;

a first dividing step that divides the modulated signal that underwent a Fourier transform by the first Fourier transform step into N sub-spectra;

a first frequency converting step that frequency-converts the N sub-spectra that were divided by the first dividing step to superimpose the part of the sub-spectra;

a first combining step that combines the N sub-spectra that were frequency-converted by the first frequency converting step; and a first inverse Fourier transform step that carries out an inverse Fourier transform on the sub-spectra that have been combined by the first combining step to generate a transmission signal.

24. The wireless communication method according to claim 22, wherein the receiving filtering step comprises:

a second Fourier transform step that performs a Fourier transform on the received signal;

a second dividing step that divides the received signal that has undergone a Fourier transform by the second Fourier transform step into N sub-spectra;

a second frequency converting step that frequency-converts the N sub-spectra that were divided by the second dividing step to return them to their frequencies prior to being frequency-converted at the transmitting device;

a second combining step that combines the N sub-spectra that were frequency-converted by the second frequency converting step; and a second inverse Fourier transform step that carries out an inverse Fourier transform on the received signal that was combined by the second combining step.

25. The wireless communication method according to claim 22, wherein the sub-spectrum replica generating step comprises:

a third Fourier transform step that performs a Fourier transform on the re-modulated signal that has been generated by the re-modulating step;

a second dividing step that divides the re-modulated signal that has undergone a Fourier transform by the third Fourier transform step into N sub-spectrum replicas of the same frequency bands as the part of the sub-spectra that has been superimposed by the transmitting device;

a third frequency converting step that converts each of the N sub-spectrum replicas that have been divided by the second dividing step to the same frequency as the frequency conversion in the transmitting device; and a third inverse Fourier transform step that carries out and outputs an inverse Fourier transform on the N sub-spectrum replicas that have been converted to the same frequency by the third frequency converting step.

26. The wireless communication method according to claim 22, wherein the combining filtering step comprises:

a fourth frequency converting step that converts the N post-compensation sub-received signals that have extracted by the subtraction step to the frequency of each modulated signal prior to frequency conversion at the transmitting device side;

a third combining step that combines the N post-compensation sub-received signals that have been frequency converted by the fourth frequency converting step to generate a post-compensation received signal; and a third inverse Fourier transform step that carries out an inverse Fourier transform on the post-compensation received signal that was combined by the third combining step.

27. A transmitting method that performs wireless communication with a receiving device comprising:

an encoding step that encodes transmission data;

a modulating step that modulates the encoded data that was encoded by the encoding step; and a transmitting filtering step that converts the modulated signal that was modulated by the modulating step into N divided sub-spectra (N being an integer of 2 or more), frequency converts the divided N modulated signals to superimpose part of the sub-spectra, and combines and outputs the N modulated signals on which the part of the sub-spectra has been superimposed.

28. A receiving method that performs wireless communication with a transmitting device, the receiving method comprising:

a receiving filtering step that, in the received signal, inserts a "0" into the frequency bands other than the frequency band of the sub-spectrum with the greatest frequency bandwidth among sub-spectra that are frequency bands of modulated signal and that have been divided by N (N being an integer of 2 or more), and outputs the received signal in which "0" has been inserted;

a first demodulating step that demodulates the received signal from the receiving filtering step to output a tentative demodulated signal;

a re-modulating step that modulates the tentative demodulated signal from the first demodulating step to generate a re-modulated signal;

a sub-spectrum replica generating step that converts the re-modulated signal that has been generated by the re-modulating step into N-divided sub-re-modulated signals and outputs them;

a second spreading step that, among the sub-re-modulated signals divided by N by the sub-spectrum replica generating step, spreads those other than the sub-re-modulated signal with the greatest frequency bandwidth to the same bandwidth as the sub-re-modulated signal with the greatest frequency bandwidth;

a subtraction step that extracts N post-compensation sub-received signals by subtracting from the received signal respective combinations of N−1 sub-re-modulated signals;

a reverse spreading processing step that, among the N post-compensation sub-received signals extracted by the subtraction step, carries out reverse spreading processing on those that underwent spreading processing at the transmitting device side;

a combining filtering step that converts the N post-compensation sub-received signals that were reverse spreading processed by the reverse spreading processing circuit to the frequency of each modulated signal prior to frequency conversion at the transmitting device side, and combines the N post-compensation sub-received signals that have been frequency converted to generate a post-compensation received signal; and a second demodulating step that demodulates the post-compensation received signal that was combined by the combining filtering step.

29. A wireless communication method that is performed by a transmitting device and a receiving device, wherein the transmitting device comprises:
an encoding step that encodes transmission data;
a modulating step that modulates the encoded data that was encoded;
a transmitting filtering step that converts the modulated signal that was modulated into sub-spectra divided into N (N being an integer of 2 or more) and outputs them;
a first spreading step that, among the sub-spectra divided into N, spreads N−1 sub-spectra other than the sub-spectrum with the greatest frequency bandwidth in a range equal to or less than the bandwidth of the sub-spectrum with the greatest frequency bandwidth; and
a first combining step that combines the sub-spectrum with the greatest frequency bandwidth and the N−1 sub-spectra that have been spread to generate a transmission signal;

and the receiving device comprises:
a receiving filtering step that, in the received signal, inserts a "0" into the frequency bands other than the frequency band of the sub-spectrum with the greatest frequency bandwidth among sub-spectra that are frequency bands of the modulated signal and that have been divided by N (N being an integer of 2 or more), and outputs the received signal in which "0" has been inserted;
a first demodulating step that demodulates the received signal in which "0" has been inserted to output a tentative demodulated signal;
a re-modulating step that modulates the tentative demodulated signal to generate a re-modulated signal;
a sub-spectrum replica generating step that converts the re-modulated signal that has been generated into N-divided sub-re-modulated signals and outputs them;
a second spreading step that, among the sub-re-modulated signals divided by N, spreads those other than the sub-re-modulated signal with the greatest frequency bandwidth to the same bandwidth as the sub-re-modulated signal with the greatest frequency bandwidth;
a subtraction step that extracts N post-compensation sub-received signals by subtracting from the received signal respective combinations of N−1 sub-re-modulated signals;
a reverse spreading processing step that, among the N post-compensation sub-received signals that were extracted, carries out reverse spreading processing on those that underwent spreading processing at the transmitting device side;
a combining filtering step that converts the N post-compensation sub-received signals that were reverse spreading processed to the frequency of each modulated signal prior to frequency conversion at the transmitting device side, and combines the N post-compensation sub-received signals that have been frequency converted to generate a post-compensation received signal; and a second demodulating step that demodulates the post-compensation received signal that was combined.

30. The wireless communication method according to claim 29, wherein the transmitting filtering step comprises:
a first Fourier transform step that performs a Fourier transform on the modulated signal that was modulated by the modulating step;
a first dividing step that divides the modulated signal that underwent a Fourier transform by the first Fourier transform step into N sub-spectra;
a first frequency converting step that converts the N sub-spectra that were divided by the first dividing step to the same frequency as the sub-spectrum with the greatest frequency bandwidth; and
a first inverse Fourier transform step that carries out an inverse Fourier transform on the N sub-spectra that were converted to the same frequency by the first frequency converting step and outputs them.

31. The wireless communication method according to claim 30, wherein the receiving filtering step comprises:
a second Fourier transform step that performs a Fourier transform on the received signal;
a null inserting circuit that, in the received signal that has been subjected to a Fourier transform, inserts a "0" into the frequency bands other than the frequency band of the sub-spectrum with the greatest frequency bandwidth among sub-spectra that have been divided by the first dividing circuit step; and
a second Fourier transform step that performs an inverse Fourier transform on the received signal in which the "0" has been inserted.

32. The wireless communication method according to claim 29, wherein the sub-spectrum replica generating step comprises:
a third Fourier transform step that performs a Fourier transform on the re-modulated signal that has been generated by the re-modulating step;
a second dividing step that divides the re-modulated signal that underwent a Fourier transform by the third Fourier transform step into N sub-re-modulated signals of the same frequency bands as the frequency conversion in the transmitting device;
a third frequency converting step that converts each of the N sub-re-modulated signals that have been divided by the second dividing step to the same frequency as the frequency conversion in the transmitting device; and
a third inverse Fourier transform step that carries out and outputs an inverse Fourier transform on the N sub-re-modulated signals that have been converted to the same frequency by the third frequency converting step.

33. The wireless communication method according to claim 29, wherein the combining filtering step comprises:
a third frequency converting step that converts the post-compensation sub-received signals that have undergone a reverse spreading process by the reverse spreading processing step to the frequency of each modulated signal prior to frequency conversion at the transmitting device side; and
a second combining step that combines the N post-compensation sub-received signals that have been frequency converted by the third frequency converting step to generate a post-compensation received signal.

34. A transmitting method that performs wireless communication with a receiving device, the transmitting method comprising:

an encoding step that encodes transmission data;
a modulating step that modulates the encoded data that was encoded by the encoding step;
a transmitting filtering step that converts and outputs the modulated signal that was modulated by the modulating step into N divided sub-spectra (N being an integer of 2 or more);
a first spreading step that, among the sub-spectra divided into N by the transmitting filter step, spreads N−1 sub-spectra other than the sub-spectrum with the greatest frequency bandwidth in a range equal to or less than the bandwidth of the sub-spectrum with the greatest frequency bandwidth; and
a first combing step that combines the sub-spectrum with the greatest frequency bandwidth and the N−1 sub-spectra that have been spread by the first spreading step to generate a transmission signal.

* * * * *